(12) United States Patent
Sinha et al.

(10) Patent No.: US 6,944,188 B2
(45) Date of Patent: Sep. 13, 2005

(54) SYNCHRONIZING CLOCKS ACROSS A COMMUNICATION LINK

(75) Inventors: Pranesh Sinha, San Diego, CA (US); Sharon Akler, Kfar-Saba (IL); Yair Bourlas, San Diego, CA (US); Timothy Leo Gallagher, Encinitas, CA (US); Sheldon L. Gilbert, San Diego, CA (US); Stephen C. Pollmann, Santee, CA (US); Frederick W. Price, Carlsbad, CA (US); Blaine C. Readler, San Diego, CA (US); John Wiss, Carlsbad, CA (US); Ell Arviv, Modiein (IL)

(73) Assignee: Wi-Lan, Inc., Alberta (CA)

( * ) Notice: Subject to any disclaimer, the term of this patent is extended or adjusted under 35 U.S.C. 154(b) by 921 days.

(21) Appl. No.: 09/790,443

(22) Filed: Feb. 21, 2001

(65) Prior Publication Data

US 2002/0114354 A1 Aug. 22, 2002

(51) Int. Cl.$^7$ .............................. H04J 3/06; H04Q 7/00; H04L 12/28; H04B 1/38; G06F 15/16
(52) U.S. Cl. ..................... 370/503; 370/350; 370/328; 370/400; 709/203; 375/222
(58) Field of Search .................................. 370/350, 400, 370/503, 412, 517, 518, 519, 360, 310, 328, 396, 392; 709/203; 375/222

(56) References Cited

U.S. PATENT DOCUMENTS

| | | | |
|---|---|---|---|
| 3,949,404 | A | 4/1976 | Fletcher et al. |
| 4,495,619 | A | 1/1985 | Acampora |
| 5,257,404 | A | 10/1993 | Goreham et al. |
| 5,261,118 | A | 11/1993 | Vanderspool, II et al. |

(Continued)

OTHER PUBLICATIONS

Lin., et al., "Error Control Coding, Fundamentals and Applications", Prentice–Hall Computer Applications in Electrical Engineering Series., 1993, pp. 315–349.

(Continued)

Primary Examiner—Hanh Nguyen
(74) Attorney, Agent, or Firm—Procopio, Cory, Hargreaves & Savitch LLP; Richard E. Campbell

(57) ABSTRACT

Apparatus, system and method for synchronizing one or more clocks across a communication link. A slave clock may be synchronized to a master clock by means of a synchronization signal sent from the master to the slave clock side of the link. The synchronization signal may be an expected signal pattern sent at intervals expected by the slave side. The slave clock may correlate received signals with a representation of the expected synchronization signal to produce a correlation sample sequence at a first sample rate which is related as n times the slave clock rate. The synchronization signal receipt time indicated by the correlation sample sequence may be refined by interpolating the correlation sample sequence around a best correlation sample to locate a best interpolation at an interpolation resolution smaller than the sample resolution. The best interpolation may in turn be further refined by estimating between interpolator outputs adjacent to the best interpolation output. The synchronization signal receipt time thus determined is compared to the expected time based upon the slave clock, which is adjusted until the times match. After initialization, all slave clock errors are preferably accumulated to prevent long-term slip between the slave and master clocks. Formerly independent master and slave clocks synchronized across the communication link constitute a noncommon clock which may be compared on each side of the link to secondary independent clocks, and the secondary independent clocks may then be separately synchronized by adjusting one to have the same difference from its local noncommon clock as the secondary clock on the other side of the link has from its local noncommon clock.

41 Claims, 11 Drawing Sheets

U.S. PATENT DOCUMENTS

| | | | |
|---|---|---|---|
| 5,297,144 | A | 3/1994 | Gilbert et al. |
| 5,420,851 | A | 5/1995 | Seshadri et al. |
| 5,444,698 | A | 8/1995 | Kito |
| 5,511,082 | A | 4/1996 | How et al. |
| 5,615,212 | A | 3/1997 | Ruszczyk et al. |
| 5,638,371 | A | 6/1997 | Raychaudhuri et al. |
| 5,638,374 | A | 6/1997 | Heath |
| 5,675,573 | A | 10/1997 | Karol et al. |
| 5,751,708 | A | 5/1998 | Eng et al. |
| 5,768,254 | A | 6/1998 | Papadopoulos et al. |
| 5,828,695 | A | 10/1998 | Webb |
| 5,859,619 | A | 1/1999 | Wu et al. |
| 5,890,055 | A | 3/1999 | Chu et al. |
| 6,006,069 | A | 12/1999 | Langston |
| 6,016,311 | A | 1/2000 | Gilbert et al. |
| 6,016,313 | A | 1/2000 | Foster, Jr. et al. |
| 6,038,455 | A | 3/2000 | Gardner et al. |
| 6,094,421 | A | 7/2000 | Scott |
| 6,112,080 | A | 8/2000 | Anderson et al. |
| 6,243,372 | B1 | 6/2001 | Petch et al. |
| 6,310,576 | B1 | 10/2001 | Johnson |
| 6,636,270 | B2 * | 10/2003 | Gates et al. ............... 348/512 |
| 6,760,316 | B1 * | 7/2004 | Hebsgaard et al. ......... 370/324 |
| 6,765,917 | B1 * | 7/2004 | Jaakkola et al. ....... 370/395.62 |
| 6,816,510 | B1 * | 11/2004 | Banerjee .................... 370/503 |

OTHER PUBLICATIONS

L.H. Charles Lee, "Convolutional Coding, Fundamentals and Applications", Artech House, Inc., 1997, p. 11–51.

Redl, et al., "An Introduction to GSM", Artech House, Inc., 1995; pp. 84, 85 and 95.

C.E. Shannon, "A Mathematical Theory of Communication", Bell System Technical Journal, pp. 379–423 (Part 1), 623–656 (Part II), Jul. 1948.

Ulm, et al., "Data–Over–Cable Interface Specifications, Radio Frequency Interface Specification", Hewlett Packard Interim Specification, published Mar. 21, 1997 by MCNS Holdings, L.P., Section 6, pp. 43–85.

Wolf, et al., "On the Weight Distribution of Linear Block Codes Formed From Convolutional Codes",IEEE, IEEE Transactions on Communications, vol. 44:9, Sep. 1996.

"Asynchronous Transfer Mode (ATM) Technical Overview", $2^{nd}$ Edition, Prentice Hall, Oct. 1995, Chapter 3, pp. 21–25.

* cited by examiner

SYNCHRONIZING CLOCKS ACROSS A COMMUNICATION LINK

CROSS REFERENCE TO RELATED APPLICATIONS

This invention is related to commonly assigned co-pending U.S. patent application Ser. No. 09/316,518, filed May 21, 1999, entitled "Method and Apparatus for Allocating Bandwidth in a Wireless Communication System," which is hereby incorporated in its entirety by reference.

FIELD OF THE INVENTION

This invention relates to data communication systems, and to synchronizing independent clocks between nodes of such systems.

BACKGROUND

Data communication systems typically transfer data from a source to an end user by routing the data in packets through a series of nodes connected by links. It is generally faster to transfer data synchronously, when circumstances permit, and yet in many instances communication system links do not share an explicit clock. In the typical circumstance that the clocks at different node are independent, and yet synchronous data transfer timing is desired. Moreover, demodulating a modulated data signal can be done more reliably if the timing of the signal is precisely known by the receiving device. Although it is possible to independently synchronize the timing of each transmission block, timing certainty can be enhanced by synchronizing the clocks on each side of a link, even across different transmission blocks. Thus, there is a need for an apparatus and method to synchronize clocks across a communication link.

In some circumstances, such as when links operate in half-duplex communication modes, information is not provided continuously from a transmitter having a master clock to a receiver having a slave clock, and indeed such periods of non-transmission may be variable. Therefore, it will be advantageous for a clock synchronization mechanism used in such circumstances to establish and retain a lock despite an absence of information for substantial periods of time compared to the clock frequency.

Some forms of data transmission occur at a particular rate. For example, a DS1 (or T1) voice connection provides 193 bits every 125 microseconds, as determined by a "network clock" used by a source of such data. It is often important for an entity receiving such data to process it at a rate which precisely matches the sending rate. One method to match the processing rate is to process the received data under control of a clock which matches the network clock. This presents a further need to synchronize clocks which are otherwise independent.

A transfer clock (symbol clock) and a network clock are typically separate clocks which are independent of each other. A particular communication link may have both types of clocks. If the two clocks in such a link are independently maintained at each end of the link, then a need arises for synchronization of both clocks in the same link.

In the situation where a common clock (such as a GPS clock) is available to both sides of a network connection, it is known to use such common clock to synchronize a slave clock to an independent master clock, as presented in "Synchronous Techniques for Timing Recovery in BISDN" by Lau, et al., IEEE Transactions on Communications, Vol. 43, No. 2/3/4, February/March/April 1995. This approach is useful only when a common clock is available. Moreover, the technique as presented cannot reliably be used to phase-lock clocks in the presence of unknown transmission phase delays.

Accordingly, there is a need to synchronize clocks across a communication link when no common clock is available, and a need for tightly synchronizing clocks across a communication link to enhance the speed and accuracy of data transfers across that link.

SUMMARY OF THE INVENTION

The above needs are addressed herein by providing a system, methods, and apparatus to synchronize one or more pairs of initially independent clocks over a communications link. Separate clock pairs may be synchronized by different techniques. For example, one can first phase-lock a "transfer" clock pair (e.g. a modem symbol clock), and then rely upon the locked transfer clock to subsequently synchronize a network clock pair.

This is useful in any communication link which needs to synchronize clocks. A communication link in the form of a broadband wireless link connecting a plurality of end users to various networks is described as an example. The broadband wireless link needs to demodulate an intermittent signal containing data. To do so, it must synchronize symbol detection to the modulated symbol transmission. Such synchronization is simplified if a clock indicative of symbol timing is locked, so that the detector always knows symbol timing, even prior to the beginning of a transmission block. Moreover, the more tightly the symbol timing clocks are locked, the faster and/or more accurate the detection can be.

The wireless link may receive data in Asynchronous Transfer Mode (ATM), which as its name implies is an inherently asynchronous communication protocol. However, the ATM data may convey data which is being provided from a source (such as a DS1 connection) at a constant bit-rate (CBR). After transfer across the link, the data will be further forwarded, also at a constant bit-rate. If the rate of the source of CBR data does not match the rate of the forwarding of the CBR data, then system buffers temporarily storing the data will either overflow or underflow. Thus, the output and input data rates should be synchronized to prevent data errors. These data transfer rates are controlled by "network" clocks. One way to ensure that the output rate is the same as the input rate is to synchronize the pair of clocks, one at each end of the link, which reflect or control network timing at their end of the link. However, the network clock on one side of the link does not have direct access to the network clock on the other side of the link. The problem created is essentially a need to synchronously convey information over an inherently asynchronous communication link. Thus, the wireless communication link system may advantageously use both transfer clock synchronization and network clock synchronization.

The invention can be practiced consistently with the general framework of the Media Access Control (MAC) protocol, as defined for example in "Media Access Control Protocol Based on DOCSIS 1.1," submitted Dec. 22, 1999 in connection with IEEE 802.16 Broadband Wireless Access Working Group and incorporated herein by reference, and is expected to be useable within the framework of the IEEE 802.16.1 MAC when that standard is defined. Some embodiments diverge from aspects of MAC protocols as presently known or proposed. In addition to embodiments within a MAC protocol framework, however, those skilled in the art will understand that the present invention may be practiced in any communication system having independent clocks which need to be synchronized to facilitate synchronous data transfers and/or consistent data transfer rates across a link.

Particular embodiments of the present invention include a millimeter wave wireless RF channel communications system which connects single base stations each to a plurality of relatively proximate Customer Premise Equipment (CPE) stations. A network of such base stations with their surrounding CPEs can provide all communications services over a large area, such as a city. This system is representative of a variety of present and future communication systems which have links joining nodes which do not share an actual clock. For such systems, the presently existing synchronization techniques are not optimal, and the improvements in synchronization taught herein enable more accurate and/or faster data transfer.

Embodiments of the present invention include methods, systems and apparatus for synchronizing a slave first clock to a master first clock. Information from the master about a timing relationship between the master first clock and a master second clock may be used to synchronize a slave second clock to the master second clock. The first clocks may be modem symbol clocks, or transfer clocks; the second clocks may be network clocks which reflect data transfer rates. The first clock synchronization may include phase-locking, even to within one thirtysecond of a symbol clock period, and the second clock synchronization may be merely frequency matched. Transmission between the master and the slave may be discontinuous, with periods of variable length between transmissions. Phase locking the first clocks may require transmission of an expected preamble at an expected time according to the master clocks, and adjustment of clock operation at the slave until the expected preamble arrives at precisely the expected time according to the slave clock. The expected preamble may be compared to the received preamble by a correlation method or circuit, which may employ one or more correlations and one or more interpolations of the correlation.

The most detailed example herein involves communication network nodes separated by a millimeter-wave radio link over which data is communicated bidirectionally using time division duplexing (TDD). Since TDD utilizes the same frequency for both uplink and downlink communications, the transmissions in each direction are received discontinuously. That is, each receive period is interrupted by a transmit period. Clock synchronization is made more difficult in this circumstance because receipt of clock timing indications disappear during these transmit interruptions, which are of a variable, though bounded, duration. The system most detailed herein also synchronizes two separate clocks—a modem symbol clock, and a network clock—across the link. However, it should be kept in mind that the present invention may be embodied in any communication system which has links joining nodes which do not share an actual clock, but which desire to synchronize one or more clocks in order to enhance data transfers.

A master side establishes a master transfer clock or a master network clock, and transmits information reflecting one of those clocks to a slave side. In the case of a master transfer clock, the information preferably includes a predetermined data stream which is sent a known quantity of transfer clock periods after a preceding data stream was sent. In the case of a master network clock, the information preferably includes numeric data reflecting a timing relationship between the master network clock and the transfer clock local to the master network clock side of the communication link.

A slave side receives information, presumably from a master side, according to which it adjusts a slave transfer clock or a slave network clock. In the case of a slave transfer clock, the received information preferably includes periodic bursts of an expected data pattern delivered at intervals separated by some number of periods of the slave transfer clock. The slave side determines the exact arrival time of the expected pattern, and from this information modifies the slave transfer clock so that its frequency tracks the timing indicated by the received data pattern. The slave transfer clock is adjusted until the number of periods of the slave transfer clock between pattern arrival times is as expected. The slave transfer clock may phase lock upon the master transfer clock which is reflected in the timing of the received data pattern. In the case of a slave network clock, the received information includes data, and the slave network clock frequency is adjusted until it has a relationship to its local transfer clock which comports with a relationship indicated in the received data.

A plurality of clock pairs may be synchronized according to the teaching of the present invention, and thus "first" clocks and "second" clocks are often referred to. However, it is sometimes instructive to refer to a concrete example rather than the most general case. Therefore, references to "symbol" clocks, "transfer" clocks, and "primary" clocks will be used somewhat interchangeably with "first" clocks. Similarly, "network clocks" will be used somewhat interchangeably with "second clocks." It will be appreciated by those skilled in the art that any synchronization technique may be used to synchronize any particular clock pair, and that the designation of the clock type (e.g. symbol, transfer, or network) is merely exemplary, and is not intended to be limiting, but rather to provide a more concrete description.

DETAILED DESCRIPTION

1. Data Links and Network Clocks

Figure 1:
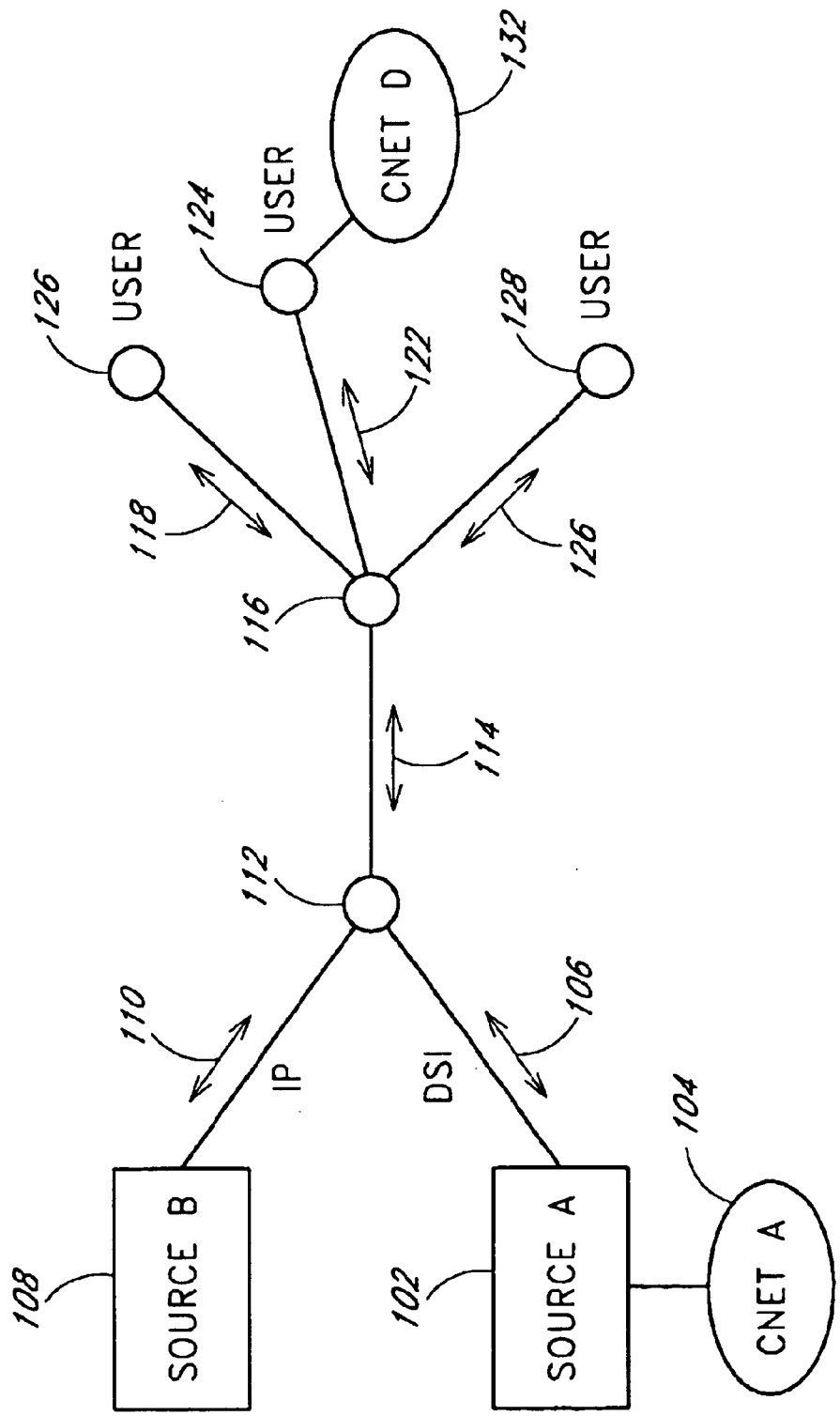
FIG. 1 shows a network carrying data, some at fixed rates, synchronously over links.

Data typically travels through a network in packets, from node to node across links. A data source can be identified, though not necessarily the original source, which determines the rate at which the data is received. Referring to FIG. 1, a Source$_A$ 102 provides data 106 to the network 130. Data 106 includes some fixed-rate data streams, such as a DS1 (also called T1) telephony connection. A network clock 104, CNet$_A$ which is local to Source$_A$, determines the precise rate at which such data is provided into the network 130. A Source$_B$ 108 represents a source of data 110 which is not necessarily supplied at a fixed rate, and may include for example Internet Protocol (IP) packets. The data from these sources is merged at node 112. Node 112 may be a switch which reformats the incoming data into a format such as ATM cells. In any event, the combined data 114 is then transferred to another node 116, from whence the data is distributed appropriately to users. From node 116, data 118 is conveyed to first user 126, data 122 is conveyed to user 124, and data 126 is conveyed to user 128.

The DS1 data 106 is delivered to user 124 from node 116 as part of the data 122, where it may be distributed to reconstruct a number of separate voice and/or one or more data connections. In order to prevent overflow or underflow of buffers at the user 124, it is important that the user 124 deliver the data 106 at a rate which precisely matches the rate at which it arrives from Source$_A$. However, the Network Clock 104 at Source$_A$, which determines that data rate, is not available to the user 124, and it will be helpful to reconstruct a clock CNet$_D$ 132 which matches at least the frequency of CNet$_A$. The nodes 112 and 116 may also need to reconstruct the clock CNet$_A$ 104. (It is also possible that the network clock CNet$_A$ which controls the rate of the representative fixed-rate data 106 is in fact local to the node 112, or even to the node 116.)

2. Modem Link Symbol Clocks

A data link connection between two nodes is likely to convey data by modulating a high-frequency carrier in a modem at one end and demodulating the modulated carrier at the other end. Such a modem connection will be assumed between node 116 and the user 124. A modem connection will generally have a clock to determine the "symbol" rate at which symbols are encoded or modulated on the carrier. Such a clock, denoted here CSym, will generally be independent of network clocks, CNet. It will substantially facilitate data transfer across a modem connection, such as between node 116 and user 124, if both sides precisely know CSym. Thus, in addition to a Network Clock CNet which will advantageously be synchronized between nodes of a network, there is likely to be a separate Symbol Clock CSym which needs to be synchronized between any two nodes which are communicating by means of a modulated carrier (i.e. through modems).

Figure 5:
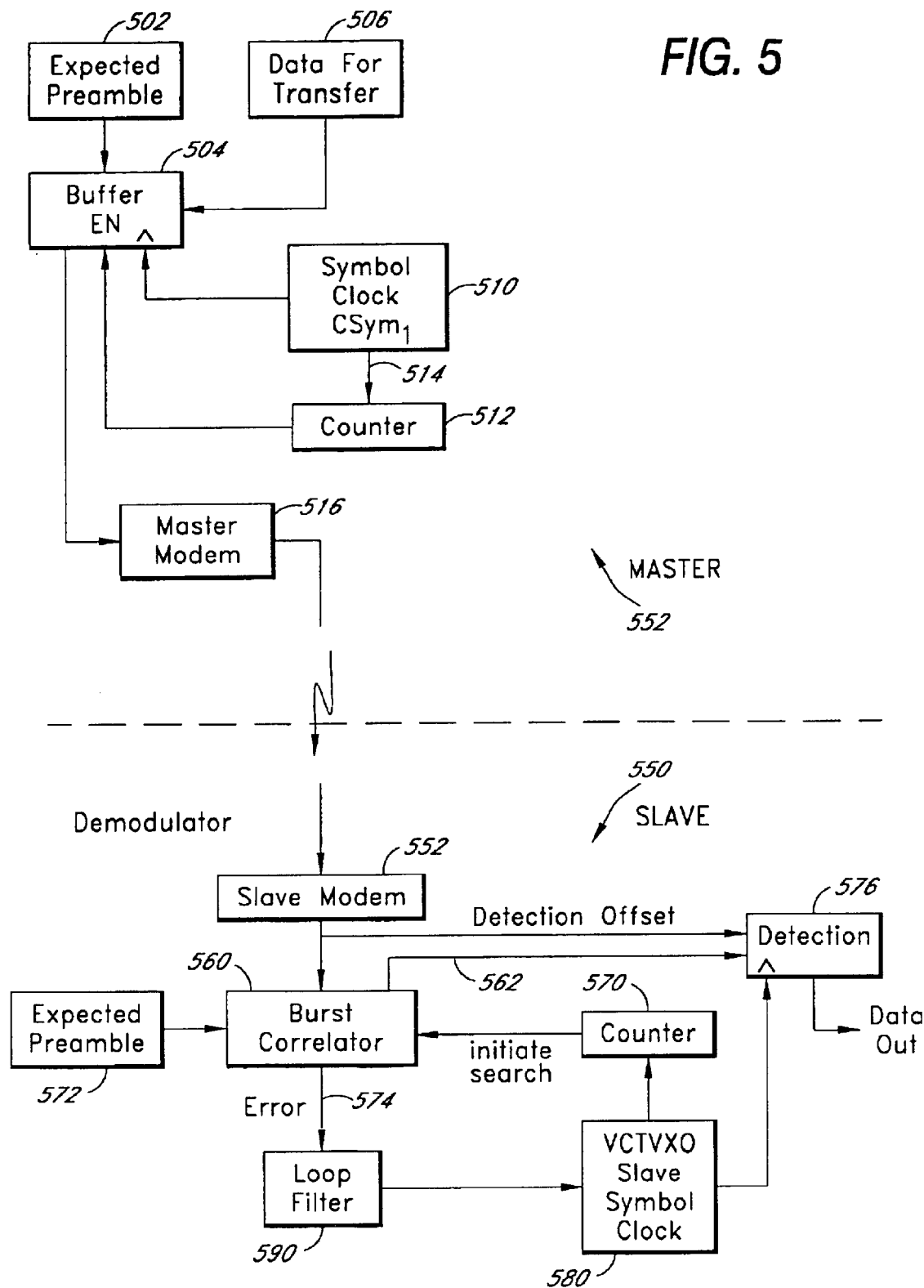
FIG. 5 shows master and slave clock synchronization system modules.

The ensuing description refers to master clocks on one side of a communication link, and slave clocks on the other side, with each slave being adjusted to match the master. A plurality of such clock master-slave pairs may exist across a given link, and in one aspect the interrelationship between at least two such pairs is described. The master and slave sides of communication links across which such clocks are being synchronized are separately identified in the figures in an effort to reduce confusion between the plural types of master-slave relationships. Exemplary links which may employ the apparatus, system or methods taught herein are defined, for example, between nodes 116 and 124 of FIG. 1, where the link conveys data 122; in FIG. 2, the master 200 and slave 250 are at opposite side of a link 240 which conveys information 242; and in FIG. 3, base station 300 is one node and a CPE, e.g. 320, is the other node, with the link in that case being 342. In FIG. 3, a multiplicity of such links is shown, each having base station 300 as one node. In FIG. 5, master 552 occurs at one node while slave 550 occurs at the other node; the link is between modems 516 and 552. Thus in each case, the synchronization of clocks is occurring between nodes across a communication link. Keeping this correspondence of nodes in mind, we turn to details of the specific figures.

Figure 2:
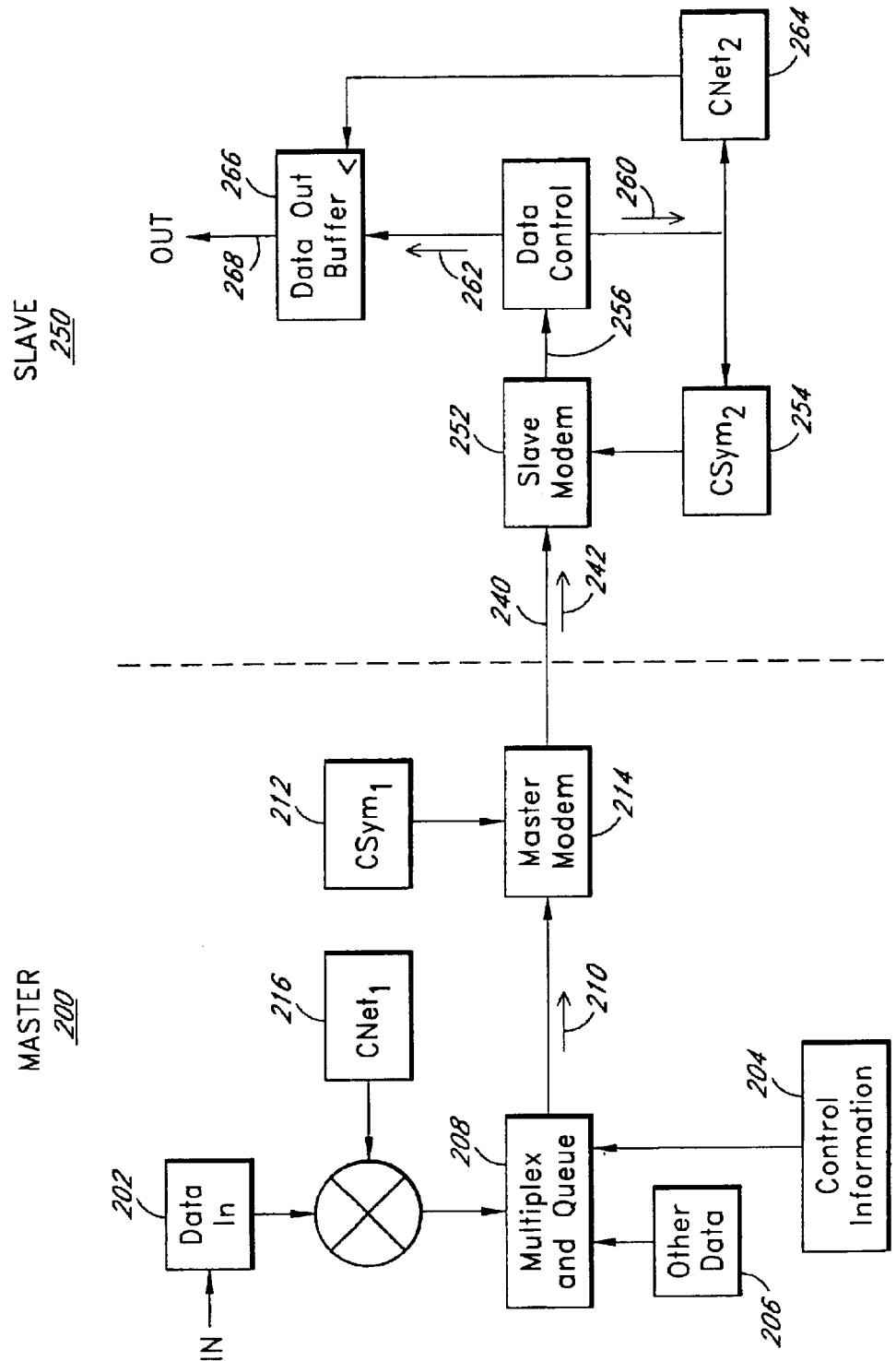
FIG. 2 is a system for synchronizing two independent clock pairs across a communication link.
Figure 3:
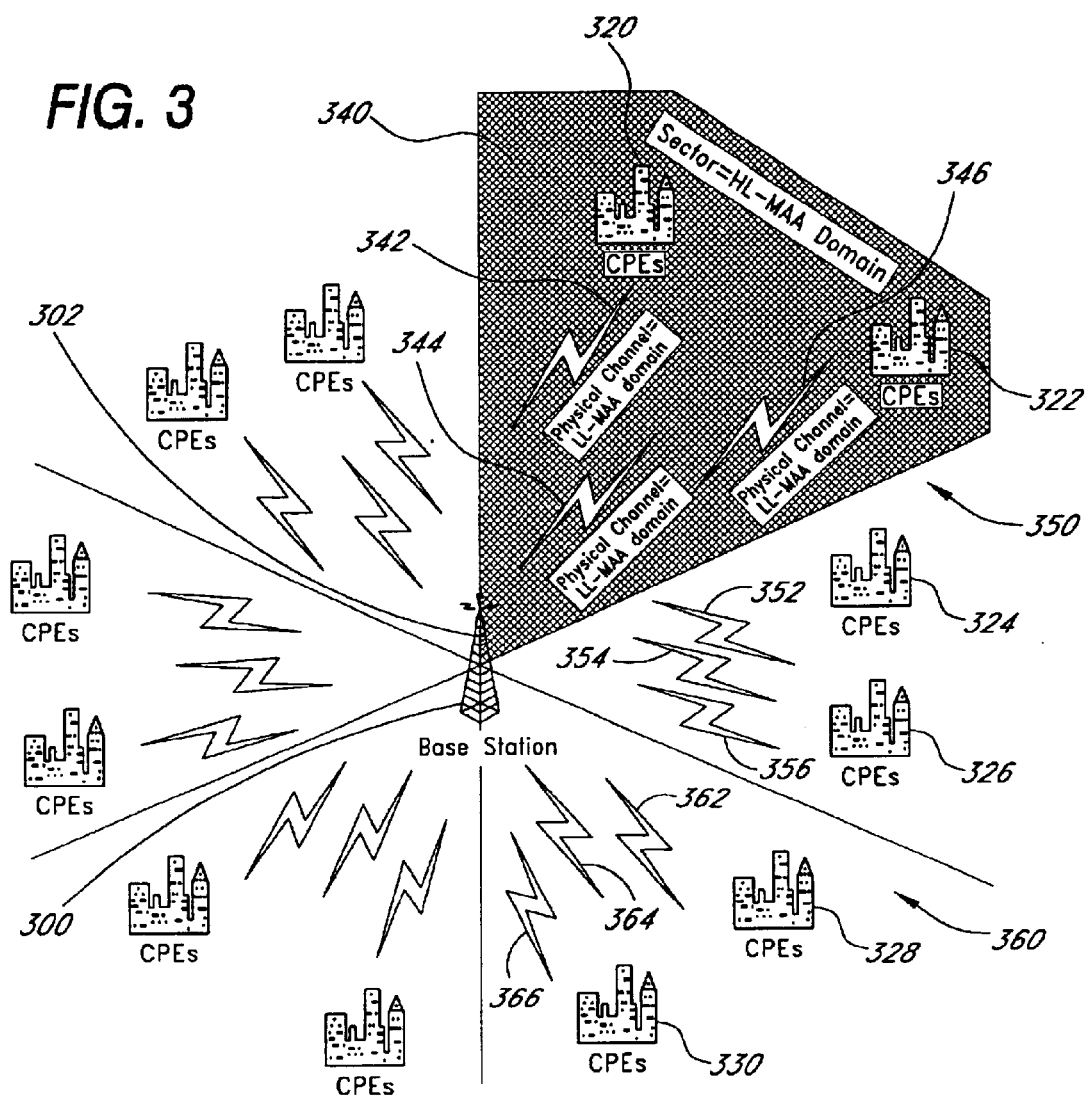
FIG. 3 shows sectorized communication links between a Base Station and CPEs.

FIG. 2 shows a combined master and slave system for synchronizing both a Network Clock pair and a Symbol Clock pair across a communication link for connecting nodes in a communication system. One node constitutes a master system 200, which is the "master" as between network clocks CNet$_X$. The master system 200 includes an incoming data module 202 which is configured to accept data from a network connection (not shown). The incoming data generally includes at least some constant bit rate (CBR) data arriving at a particular rate, and the system may include a first network clock module 216 configured to establish a network clock, CNet$_1$, reflecting that rate. The clock may be established, for example, by direct input from a source of the CBR data, or may be developed in master system 200 to match the actual rate at which CBR data is received. Module 216 is at least configured to make CNet$_1$ available to the Master 200, even though CNet$_1$ may be dependent on a remote source.

Before transferring the data 202 to the Slave 250 across the Modem Link 240, the master system 200 adds data from a control information module 204, and data from other sources 206. Control information module 204 may in particular provide data indicating a relationship between CSym$_1$ and CNet$_1$, to permit the slave CNet$_2$ to be adjusted to match CNet$_1$. This procedure is described in more detail below. The data is combined into a single bitstream in multiplexer module 208. The multiplexed data 210 will be transferred across the connection, Modem Link 240, via a master-side modem module 214, at a rate determined by a symbol clock CSym$_1$ which is developed in symbol clock module 212. The symbol clock in the symbol clock module 212 of the master system 200 need not be the "master" as between the symbol clock of the two nodes; but if it is, then it may merely provide a simple fixed clock at an appropriate frequency, and its frequency will be used by the master-side modem module 214 to send a signal across the link reflecting the symbol clock frequency. However, it may also be the "slave" of the symbol clock in slave system 250, in which event it would include the functionality described below with respect to the slave system 250. Thus it will be understood that "master" and "slave" symbol clock functions may be interchanged across the communication link. The modem module 214 accepts the data 210, modulates it as a signal, and conveys it across the link as signal 242 on a media 240, which may be RF spectrum in a wireless RF link.

The modulated data signal 242 is received and demodulated in a slave-side modem module 252, under the control of a symbol clock provided by slave-side symbol clock module 254. If the slave-side symbol clock is also the "slave" (which need not be the case), then it will be configured to be adjusted in view of the signal indicating the timing of the master-side symbol clock which will be received with modulated signal 242. In order for the signal 242 to convey data across the link via media 240 with the highest speed and lowest error rate, it is desirable that CSym$_2$ 254 be precisely synchronized to CSym$_1$. It is preferred that these two originally independent clocks be phase-locked to within a small fraction of a symbol, preferably within not more than ½ symbol, more preferably within ⅛ symbol, and even more preferably more tightly yet, for example within ¹⁄₁₆ or ¹⁄₃₂ symbol. The more consistent is the phase relationship between these clocks, the more reliable can be the demodulation of signal 242. Details of the methods and apparatus used in the slave symbol clock module 254 to phase lock the symbol clocks across the link as stated above is shown below, particular with regard to FIGS. 4–9.

Demodulated data 256 is provided to controller module 258, which among other tasks is configured to sort the combined data into control data 260 and outgoing data 262. Control data 260 may be used, for example, to control $CSym_2$ in slave-side symbol clock module 254 and/or $CNet_2$ in slave network clock module 264, and for other tasks which facilitate the transfer of data across the Modem Link 240. In particular, the control data 260 may include data reflecting a relationship between $CNet_1$ and $CSym_1$. The outgoing data 262 will be delivered from the Data Out buffer 266 as Data Out 268 at a rate controlled by $CNet_2$ 264. It is desirable that $CNet_2$ 264 at least match the frequency of $CNet_1$ 216 so as to prevent overflow or underflow of data buffers handling Data Out 266. Accordingly, in slave network clock module 264 the data reflecting the relationship between $CNet_1$ and $CSym_1$ may be compared to a relationship determined between $CNet_2$ and $CSym_2$, and the frequency of $CNet_2$ adjusted so that the relationships are matched, thereby synchronizing $CNet_2$ to $CNet_1$ by leveraging the previous synchronization of $CSym_1$ to $CSym_2$.

It will be understood by those skilled in the art that communications take place in both directions across Modem Link 240. The designation of Master and Slave in FIG. 2 reflects that the clock $CNet_2$ on the slave side is derived from the clock $CNet_1$ on the master side. The symbol clocks $CSym_1$ and $CSym_2$ also have a master and slave relationship to each other, but either side may have the symbol clock which is used as a master; this will typically be the base station side, which typically communicates to a plurality of other nodes (only one such connection is shown in FIG. 2 for simplicity). Details for the functions of the various modules shown in FIG. 2 may be gleaned from the further description of the present system, method and apparatus which is described in more detail with respect to FIGS. 3–13.

3. Communication Subnetwork System

A specific communication subnetwork which includes an apparatus and system performing the modem link functions described above, in which both a network clock and a symbol clock are synchronized across a link, is described in detail in related U.S. Ser. No. 09/430,379, incorporated hereinabove by reference. U.S. Ser. No. 09/430,379 describes a communication subnetwork or system having base stations which each provide wireless links for transferring data between a plurality of end users (e.g. FIG. 1, reference 120, 124 and 128) and a network through a broadband wireless link such as Modem Link 240. This link uses a limited media, namely the wireless communication spectrum, which must be shared by the plurality of users. In order to use the limited spectrum (or bandwidth) efficiently, the timing between the ends of the link, corresponding to master 200 and slave 250, is preferably very tightly synchronized.

FIG. 3 shows details of the arrangement of links to a plurality of users, as is also described in the referenced wireless communication system. The Base Station 300 includes apparatus and control to perform master clock functions for both a network clock and a symbol clock. The Base Station 300, via its antenna structure 302, transmits to (and receives from) a plurality of users each having a corresponding Customer Premise Equipment (CPE) station at 320, 322, 324, 326, 328, 330, and so on (note that these may each have a plurality of such CPEs).

The transmissions to and from the antenna structure 302 are directional in nature, so that channels are limited to particular transmission sectors, for example sectors 340, 350, and 360. Within the antenna structure 302, but not shown, are at least one directional antenna for each sector. There may be a plurality of directional antennas serving any one sector, and there may be one or more standby antennas for each sector as well. Each directional antenna may be packaged together with electronics which provide up-conversion, filtering and power amplification of signals received by cable from the base station 302, the combination forming an "outdoor unit" (ODU). Of course, many other satisfactory configurations can be designed. Transmissions within a particular sector, such as sector 340, are limited to the CPEs 320 and 326 which are located within the transmission scope of that sector. Similarly, transmissions in sectors 350 or 360 are limited to CPEs at 324 and 326, or at 328 and 330, respectively. The transmissions between different sectors are independent of each other. Such "sectorized" transmission permits spectrum reuse within a narrow area, thus providing more bandwidth to service particular users. This arrangement limits the number of users which are multiplexed onto a single wireless link and thus must share the capacity of that link.

Within sectors, the downlink transmissions are multiplexed, while bidirectionality is managed through adaptive time division duplexing. Each CPE has a distinct "virtual" connection, or channel, (e.g. 342) within its sector (e.g. 340). Since FIG. 3 arbitrarily represents three such channels per sector, there may be one CPE at 320 and two at 322, one at 324 and two at 326, and so on. There is generally a one-to-one correspondence between virtual channels 342–346 and the CPEs at 320 and 322 in sector 340, between virtual channels 352–356 and the CPEs at 324 and 326 in sector 350, and between virtual channels 362–366 and the CPEs at 328 and 330 in sector 360. These are merely representative; either fewer or significantly more virtual channels are possible within any particular sector, particularly if multiple frequencies are available. (If a plurality of carrier frequencies is available, the available frequencies may be allocated as needed between CPEs within a sector.)

Within each sector, communications are bidirectional on the basis of Adaptive Time Division Duplexing (ATDD). All CPEs within a particular sector receive the same transmission from the antenna structure 302 of the Base Station 300 during a downlink portion of a time frame, while a second portion of the time frame is used for uplink communications from CPEs to the Base Station 300. The frame duration is preferably constant, but the proportion of time within the frame which is allocated for downlink versus uplink transmissions is varied according to the needs of the channels served. Uplink transmissions are preferably time division multiplexed, and each separate CPE in a sector will be allotted a unique time slot if they need to uplink data.

Figure 4:
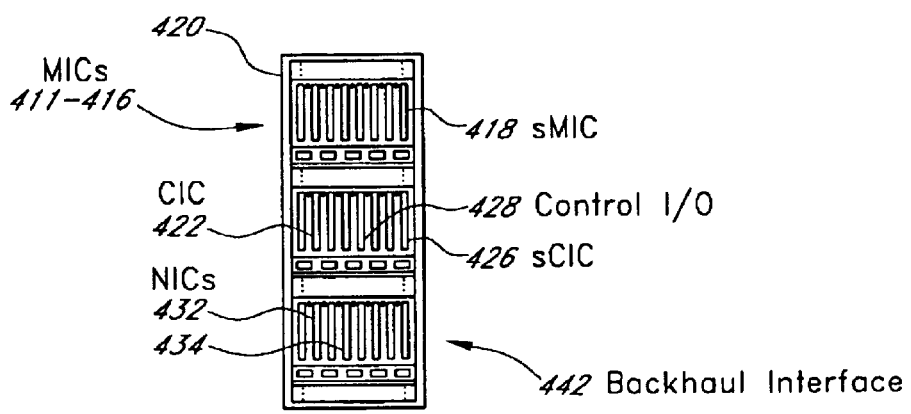
FIG. 4 shows indoor unit apparatus implementing Base Station functions.

FIG. 4 shows an exemplary equipment arrangement in the Base Station 300, which may be referred to the "indoor unit" (IDU). The IDU equipment may provide signals to the ODUs, for example by sending signals from modem interface controller card (MICs) 411–416 on a cable to each ODU at an intermediate carrier frequency. Each of the sectors, e.g. 340, requires at least one distinct ODU having an antenna and preferably a frequency converter. Each of the ODUs may be connected to a distinct modem interface controller (MIC) 411–416 corresponding thereto (although more than one MIC may be built on the same physical printed circuit board). Note that the six referenced channels are merely exemplary, and were chosen for consistency with the six sectors which are arbitrarily shown in FIG. 3; more or less sectors may be provided for any particular base station 300.

Signals received by the ODUs within the antenna structure 302 are frequency down-shifted and delivered to the corresponding MICs 411–416. Those skilled in the art will understand that the functional steps required for raising the modulated data signal to the transmission frequency, as well as the functional steps required for receiving and downconverting received signals, can be divided many ways between different components. The MICs corresponding to each ODU may be supplemented by one or more standby MICs, or sMICs 418, which may be arranged for connection to an ODU in the event of a failure of either the MIC or ODU serving a particular sector.

The base station IDU also includes at least one backhaul interface 442 for physically connecting to a communication line. It will typically also include at least one Network Interface Controller (NIC) card 432, 434, for controlling the connection to one or more incoming communication lines. Cards 432, 434 may each include a plurality of such NICs, or (to the same effect) may include a NIC capable of controlling a plurality of network interfaces. For example, each NIC card may handle four T3 or E3 connections which provide data in a fixed-length packet having an ATM protocol. However, many other types of connections may be implemented in NIC cards, including variable-length IP packet connections, ethernet connections, and so on. There may be a plurality of backhauls, and each backhaul may be a wire line, an optical line, a microwave connection, a satellite link, or any other high capacity data connection to a data router (not shown) which in turn interfaces to the Internet and/or to other wide area networks, such as the public telephone network.

Particularly in the IDU of the base station 300, it is useful to include a separate Control Interface Card CIC 422. The CIC may be connected to a remote terminal for control data entry, such as through a Control I/O card 428, which might permit connection to an Ethernet or other high-speed local area network which in turn is connected to a terminal. Again, many other arrangements are possible; for example, a multitude of different local area networks (LANs) or wide area networks (WANs) may be used to connect to the controlling terminal, or it may be connected by a dedicated line, or even integrated with the CIC or other electronics of the IDU. For a fully redundant system, a standby CIC sCIC 426 may be provided. Cables from the IDU to the network, and other cables from the IDU to the ODUs in antenna structure 302, are not shown. It is also possible to include other functionality in the base station, such as a direct broadcast satellite receiver equipment, and a video server and central computer 430 to perform functions such as high level set-up and maintenance of service provision to individual customers, system component failure detection and correction, and other high level functions.

Thus, in the exemplary embodiment shown in FIGS. 3 and 4, a Base Station 300 may maintain wireless links with a large number of CPEs each having their own virtual channel. The physical communications are sectorized, with one or more CPEs within each sector which are multiplexed onto an adaptive time division duplexed link. The following discussion regarding synchronization of clocks across the link will deal with only one such virtual channel between a base station (typically master side) and a CPE (typically slave side). Those skilled in the art will have no difficulty extending the synchronization to a multiplicity of CPEs linked to a base station 300, as are described above.

4. Symbol Clock Synchronization Across a Link

The preferred communication subnetwork system preferably employs an Adaptive Time Division Duplex (ATDD) technique for communication across the wireless link. ATDD is preferably implemented in a framed system in which communication bursts take place periodically, and the burst period defines the time boundaries of a frame. Downlink communications from the base station to the CPEs take place during one portion of each frame, and since the technique is adaptive, that portion is variable in length.

The base station also preferably employs a variety of modulation techniques, sometimes in combination with a variety of error correction techniques, to direct data to particular CPEs. The combination of modulation and error correction creates a particular robustness level. CPEs cannot reliably read transmissions which are not sent with at least a particular level of robustness. Therefore, CPEs will effectively receive transmissions only during a downlink portion of a frame, and only during that part of the downlink portion when the rubustness level is adequate. Thus, clock synchronization should work even when the slave end of the link receives transmissions only during only a small part of the frames.

In order to accurately identify symbols, the symbol clock of a CPE or slave will preferably be locked to within ½ symbol period to a BS or master symbol clock. It is progressively more desirable that the clocks be phase locked to within ¼, ⅛, ¹⁄₁₆, or ¹⁄₃₂ of a symbol. Such levels of phase locking will preferably be maintained even under adverse signal conditions. The system and method disclosed herein will maintain one of these levels of phase locking even if communication from the slave to master is completely absent from some frames; or if communication from master to slave is variable in length and occupies as little as 0.000125, or even 0.00006, of the time in a given frame; or even if communication from master to slave is interrupted for as much as five typical 1 ms frames. As an example, a symbol clock operating at 20 MHz may be synchronized across a link through transmissions which occupy only 25 symbol clock periods, or even 12 periods, sent once per millisecond.

4.a. Burst Modem and Preamble

Reference is made to FIG. 2 to describe further details of an exemplary embodiment of apparatus for synchronizing a symbol (or other noncommon) clock across a communication link (or modem link). To provide locking information despite variable periods of non-transmission, it is preferred that the master side 200 of FIG. 2 of the modem link initiate communication bursts at fixed intervals expected by the slave. The modulated signal 242 is provided by a master-side modem 214 in a burst which is initiated at preferably constant intervals which are defined by a precise number of periods of the master symbol clock $CSym_1$ 212. In particular, $CSym_1$ may operate at nominally 20 MHz, and the bursts may be initiated at a periodic interval of 1 ms.

The beginning of a burst preferably includes a preamble which will be recognized by the slave. For simplicity, the preamble may be the same for each burst. A 25 bit preamble is preferred, but is a tradeoff between bandwidth consumed by the preamble and the simplicity of obtaining an accurate recognition of the preamble and thus a precise determination of the frame timing. Moreover, after phase lock is achieved, only 12 preamble bits are preferably used to maintain phase locking.

4.b. Symbol Clock Synchronization System Blocks

FIG. 5 shows modules of both a master system and a slave system which work together to synchronize a symbol clock. On the master side 552, the expected preamble module 502 is preferably configured to provide a fixed, predetermined pattern of 25 bits. The preamble module 502 may also vary the pattern depending upon whether phase lock has already been acquired, and upon other factors affecting the ability to acquire and maintain a phase lock, such as weak signal strength or the presence of electrical noise. The preamble is preferably prepended to data in the buffer module 504, which is configured to queue incoming data from the transfer module 506 in preparation for transfer across the link. Transfer module 506 is configured to accept data from elsewhere in the system, such as from the ATM switch, and to structure the data into frames, with data for particular CPEs placed in the frame at predetermined locations known to the receiving CPEs. The master symbol clock module $C_{Sym1}$ 510 may be any frequency which is convenient for the system, for example a 20 MHz clock. The master symbol clock module $C_{Sym1}$ 510 controls the rate that symbols are transmitted from the buffer module 504 to the master modulator module 516. The Master modem module is configured to modulate the data onto a carrier frequency, which may be an intermediate frequency for convenience in transmission to an antenna location. The data signal, thus modulated, will be transferred across the link from the Master 552 to the Slave 550. The buffer module 504 will output a burst of data after the counter module 512 counts to a number of clock periods equal to a frame period, preferably 1 ms. The clock output from the master symbol clock module $C_{Sym1}$ 510 to the counter module 512 is doubled to 40 MHz, and the counter module 512 counts down from 40,000 before providing an enable output to the buffer module 504 to cause it to begin sending the data stream, including the preamble, to the master modem. The master modem module 516 modulates the data onto the carrier and causes it to be transmitted over the air to the slave side 550 of the link.

The slave modem module 552 is configured to demodulate and filter the transmitted data. Its output goes to a burst correlator module 560. The burst correlator module 560 is configured to compare the signal from the slave modem module 552 to a signal from the expected preamble module 572. The expected preamble module is configured to provide a representation of the preamble expected from the master side. The preamble may be fixed, but is preferably selectable in coordination with the master 552. A 12 bit preamble is employed, and during acquisition is preferably sent twice separated by one bit during acquisition.

The burst correlator module 560 is configured to determine an arrival instant for the preamble signal from the master 552. This time point is presumed to be a known number of master symbol clock periods after the arrival of the previous preamble, and is compared to an output from the counter module 570. The counter module 570 is configured to output time indications separated by a comparable number (preferably the same number) of slave symbol clock periods as the number of master clock periods separating the sent preamble. Thus, the counter module 570 presents an "expected time" for arrival of the preamble. The counting is preferably reset upon arrival of a first preamble, and is thereafter not reset, so that all errors are cumulative.

The burst correlator module 560 is also configured to compare the timing indication from the counter module 570 to the arrival time determined for the preamble, and to output the difference as error output 574. Error output 574 in turn is input to the loop filter module 590, which is configured to filters the signal and then applies it as a control signal to the slave symbol clock module 580. Slave symbol clock 580 is configured to respond to changes in the control signal by adjusting its frequency.

The burst correlator module 560 may be configured to determine the difference between the expected and actual arrival time of the preamble by analog means, but preferably converts the signal from the slave modem 552 into a digital representation. The burst correlator module is preferably configured to sample the signal to provide a complex pair of 10-bit samples at a multiple of the symbol clock rate. The multiple is preferably 1, 2, or 4 for convenience, but need not be $2^k$, k an integer, and need not even be an integer number. Other sampling approaches may be used, and particularly other multiples of the clock rate. The tradeoffs, such as processing requirements versus the error signal accuracy and resolution, will become apparent to those skilled in the art. Further details of the burst correlator module 560 are presented below with respect to FIG. 6.

The output from the slave modem module 552 also goes to a detection module 576 which is configured to determine the value of the bit stream contained in the signal, and convey it as data out to the rest of the slave communication system. To do so, the detection module is configured to further accept an input from the slave symbol clock 580 representing the symbol clock rate, and a detection offset input 562 from the burst correlator module 560.

One skilled in the art will understand that the preamble merely needs to be expected in cooperation between the master and slave, and need not be identical each frame. The burst needs merely to be initiated at an expected time, rather than being sent at fixed intervals as is done for design convenience in the preferred embodiment. As long as the slave system can recognize the preamble and knows when it should arrive, it can generate an error indication to adjust its local symbol clock oscillator.

The functions of the modules can be performed in either hardware or software. In the case that the signal transmitted across the link is an analog signal, at least some hardware processing must be done until the signal has been digitized. Thereafter, a designer will choose to use hardware or software on the basis of the particular application.

Those skilled in the art will appreciate that the functions of the different modules may be arranged in an unlimited number of ways. For example, functions from different modules may be performed in the same physical device. Indeed, all of the modules of the master side or of the slave side can be designed to be performed by a single application-specific integrated circuit (ASIC). As another example, functions from any particular module need not be performed in a related physical location with other functions of such module, but may be scattered into other modules, except that slave-side modules are separated from master-side modules by the communication link. Finally, the functions of modules may be incorporated into a different number of functional blocks, so that either more or fewer modules are apparently utilized in any actual embodiment without significantly changing the system.

4.c. Symbol Clock Synchronization—More Detailed Block Representation

It is preferred that the slave symbol clock be phase-locked to the master symbol clock. It is helpful, toward this end, to enhance the resolution with which the burst preamble timing can be detected. Any technique can be used in conjunction with other aspects of this invention. For example, a classic technique involves supplying the received preamble to a bank of correlators, the other input of the correlator being given a time-shifted version of the expected preamble. The time shift applied to the expected preamble in the correlator found to have the largest magnitude output is deduced to most accurately reflect the actual burst timing. The preferred correlator system module achieves a similar effect by different means.

4.c.1. Input Processing Blocks

Figure 6:
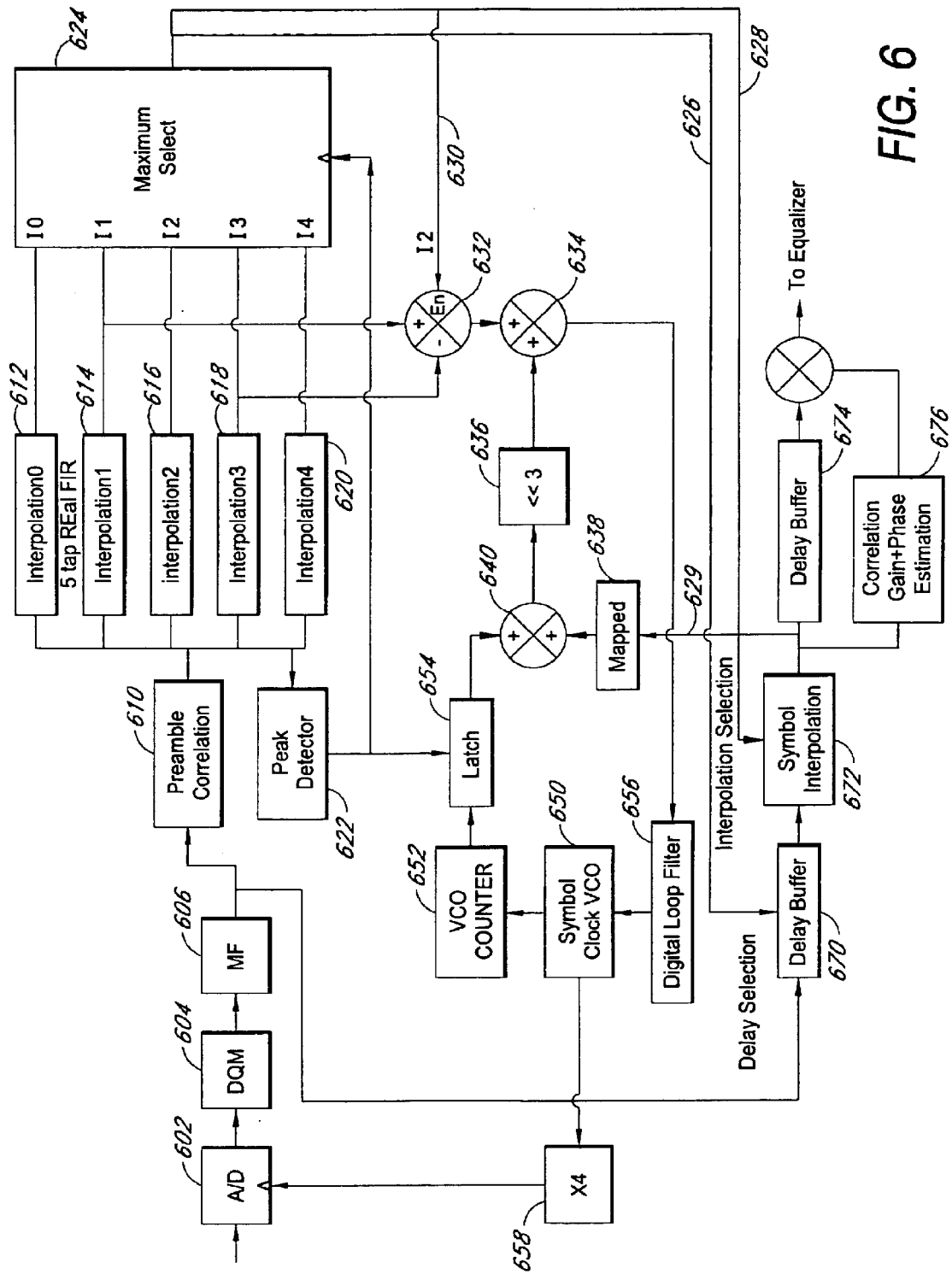
FIG. 6 is a more detailed block diagram of the slave symbol clock synchronization system.

FIG. 6 shows further details of the slave side of a symbol clock synchronization circuit or system. The A/D converter 602 samples the incoming signal, which has been demodulated from the millimeter wave transmission frequency to a 40 MHz center frequency, at 80 MSamples/s with 10 bits of resolution. The samples are clocked by the 4× frequency output of clock multiplier 658. The signal is downconverted to DC baseband at DQM 604, providing a sequence of complex pairs of 10-bit I values and 10-bit Q values. The complex sequence is filtered in the match filter MF 606. The match filter performs root raised cosine filtering, providing full raised cosine filtering in conjunction with filtering at the transmit side, and outputs 40 MS/s 10-bit complex values. The preamble correlation 610 is an output sequence of 10-bit real numbers, at a 40 MSample/s rate, which reflect correlation of the incoming signal with an expected preamble signal. The 40 MSample/s rate is related as n times the slave clock rate, where n is preferably 2 as a convenient compromise between processing burden and signal reproduction accuracy. However, those skilled in the art will understand that n, while preferably integer, need not be $2^m$, m an integer, and indeed may be other than an integer. This multiple sets the basic resolution of the correlation output to a correlation resolution, which as described is 1/n time the slave clock period, that is, the correlation sample period.

The preamble correlation output sequence 610 goes to interpolators, described below, and also into peak detector 622. Peak detector 622 provides an edge only after the received signal matches the expected preamble; the edge output is delayed appropriately to indicate a time when the correlation output will be centered in the interpolator registers into which it will be shifted. The preamble correlation 610 is described in more detail with respect to FIG. 7, and the peak detector 622 is also described in more detail with respect to FIG. 9.

4.c.2. Preamble Interpolation Blocks

Since the sample rate is 40 MS/s, n times the symbol clock rate, the preamble correlation 610 can only identify the incoming preamble timing to within 1/n or ½ of a symbol period (the symbol clock is 20 MHz). Accordingly, in order to lock the Symbol Clock VCO 650 more accurately to the master symbol clock reflected in the arrival time of the preamble, more resolution of the precise preamble arrival time is desirable. One output of the preamble correlation 610 is a correlation sequence of five 10-bit real numbers, centered around the highest magnitude output peak from the preamble correlator.

The correlation sequence is shifted through a bank of five interpolators 612–620. Each interpolator is a five-tap finite impulse response filter, and each essentially correlates the sequence with an impulse shifted in time by ⅛ symbol, or ¹⁄₁₆₀ MHz seconds, from interpolator to interpolator. This ⅛ symbol is an interpolator resolution, which is a smaller time unit than the sample resolution. Each of these interpolators outputs a value, I0 from interpolations 612, I1 from interpolation1 614, I2 from interpolation2 616, I3 from interpolation3 618, and I4 from interpolation4 620. The maximum select block 624 identifies the largest magnitude interpolator output, which reflects the actual timing of the preamble signal to within the interpolator resolution of ⅛ symbol period. That is, the timing of the correlation output is interpreted to be ¼ or ⅛ period earlier, right on time, or ⅛ or ¼ period later than the normal correlation pulse (which has a resolution of only the sample clock period, which is ½ symbol clock period).

4.c.3. Symbol Centering/Resolving Blocks

The preamble interpolation maximum select block 624 output is used to align the symbol detection (not shown) to the center of the symbol signals so as to best resolve each symbol. First, the delay selection output 626 of the maximum select block 624 indicates the most accurate ½ symbol delay to apply to synchronize the incoming symbol signals. This selected delay is then applied to all subsequent filtered 10-bit complex sample pairs arriving at the delay buffer 670 from the match filter 606 (until the next preamble arrives).

Second, the interpolation selection output 628 from the maximum select block 624 indicates which interpolator filter should be used to effectively synchronize the symbol signals to within ⅛ symbol period. This selection is then applied to all incoming symbol signals at symbol interpolation bank 672. This is a bank of five interpolators, providing five possible timing shifts from −¼ to +¼ symbol periods in ⅛ period increments. One of the five interpolators of bank 672 is chosen for application by selection output 628. This automatic adjustment of interpolation may be restricted to periods when the symbol clock is not phase-locked to within some phase range of the master. In a well-behaved system, phase lock to within ⅛ of a symbol should eventually be achieved. Thereafter, it has been found generally preferable to force the symbol interpolation bank 672 to use the same interpolator constantly, irrespective of selection output 628, so that the various delayed values in digital filters in the system remain valid, and are not effectively shifted in time compared with more recent data.

After the incoming signal has been interpolated in symbol interpolation 672, it enters circuitry to detect the value of each symbol. It enters a delay buffer 674, and a correlation gain and phase estimation 676, the outputs of which are forwarded to an equalizer which reduces intersymbol interference and derives a refined identification of each incoming symbol. This filtering and symbol identification can be done by any of the means now known or hereafter developed for such symbol detection.

4.d. Slave Symbol Clock VCO Control Blocks

The voltage controlled oscillator symbol clock VCO 650 is the 20 MHz slave symbol clock which is to be synchronized to the master symbol clock. The output of symbol clock VCO 650 is doubled at frequency doubler 648 to 40 MHz, and then clocks the VCO Counter 652. A further doubling at frequency doubler 658 to 80 MHz establishes the input A/D sample clock. To accomplish synchronization, of course, differences or errors between the slave symbol clock 650 and the master symbol clock must be detected. In order to phase lock, an error must be determined with a resolution able to reflect phase error.

4.d.1. First Order Error

VCO Counter 652 counts the number of slave clock periods which is expected between preambles from the master; preferably, the period is 1 ms and the VCO counter therefore counts modulo 40000. The VCO Counter operates at a multiple q times the slave clock frequency; q is preferably an integer, preferably $2^k$, k an integer, and preferably is 2. However, q need not be an integer.

The counter is reset to zero when the first preamble arrives after a long hiatus, and thereafter it is not reset. The counter input to the VCO control circuit therefore functions as an (effectively) infinite integrator, because all remaining error between the expected number of cycles and the actual number of cycles is accumulated as a sum, and is carried forward and applied to compensate the clock frequency.

Output 622 from the preamble correlation 610 is a preamble-indicating edge having a fixed relationship to the highest output sample of the correlation circuit. As such, the preamble-indicating edge has a time resolution equal to the sample period of the correlation circuit output. This edge is preferably delayed as needed, and is used (thus delayed) to latch the outputs of the interpolation filters 612–620 when the highest output of the preamble correlation 610 has been shifted until it is centered in the interpolation shift register. The same preamble-indicating edge 622 is used to latch the value of the doubled VCO counter 652 into latch 654. The doubled VCO counter is initially reset upon receiving a first preamble-indicating edge 622, and operates at the same modulo as the master symbol clock burst timing counter. Therefore, the latched value reflects the error between the master and slave clocks to within ½ symbol period. This error indication preferably has at least the same resolution of the synchronization signal receipt time as is imposed by the correlation sample rate. In this case, the resolution is 1/n slave symbol clock periods, where n is 2.

4.d.2. Second Order Error

This error indication, at half-symbol (or 1/n slave symbol clock period) resolution, is left-shifted two bits by left-shift block 642, effectively multiplying the error by 4 so that two LSBs can be appended in adder 640. The LSBs are obtained at mapped block 638 by mapping a number which reflects an addition of from −2 to +2, based upon the interpolation selection 628 which indicates which of I0 to I4 is largest (and thus indicates a best interpolation). The mapped value provides an interpolation of the position of the best correlation peak to within ⅛ symbol period, significantly less than the ½ symbol period provided by the correlation samples, and this mapped value is then added to the shifted value of the latch at adder 640.

4.d.3. Further Resolution

The output of adder 640 has a resolution of ⅛ symbol period. It may be applied directly to a digital loop filter like 656 to drive the symbol clock VCO 650. However, further refinement is preferred. Therefore, the output of adder 640 is multiplied by 8, for example by left shifting 3 bits in left shifter 636. Then, if I2 provides the best interpolation, i.e. has the largest interpolator output (indicating that the clocks are less than ⅛ symbol period mismatched from a time indicated by I2), then the differencer 632 will be enabled. Differencer 632 compares the interpolator outputs adjacent to the best interpolation, in this case comparing interpolation1 614 and interpolation3 616. Before comparing, the 14-bit outputs of the interpolations are left-shifted by 10 bits (i.e. multiplied by 1024). Then, the result of the difference between these two shifted outputs is clipped so as not to fall outside the range −8 to +7. The three-bit number resulting from this clipped comparison is then added to the (3-bit left-shifted) value from the ⅛ symbol error value.

The output of adder 634 thus has a LSB resolution of 1/64 symbol period, which is substantially less than the interpolator output. This output is fed into the digital loop filter 656 to drive the symbol clock VCO 650. However, if I2 was not the largest interpolation output latched by the correlation edge, then adder 632 is effectively disabled, and its output is held at zero. However, the error resulting from interpolation is still left-shifted by three, even though no further estimation of the interpolated synchronization signal receipt time is added.

4.e. Refined Correlation Block Diagram

Figure 7:
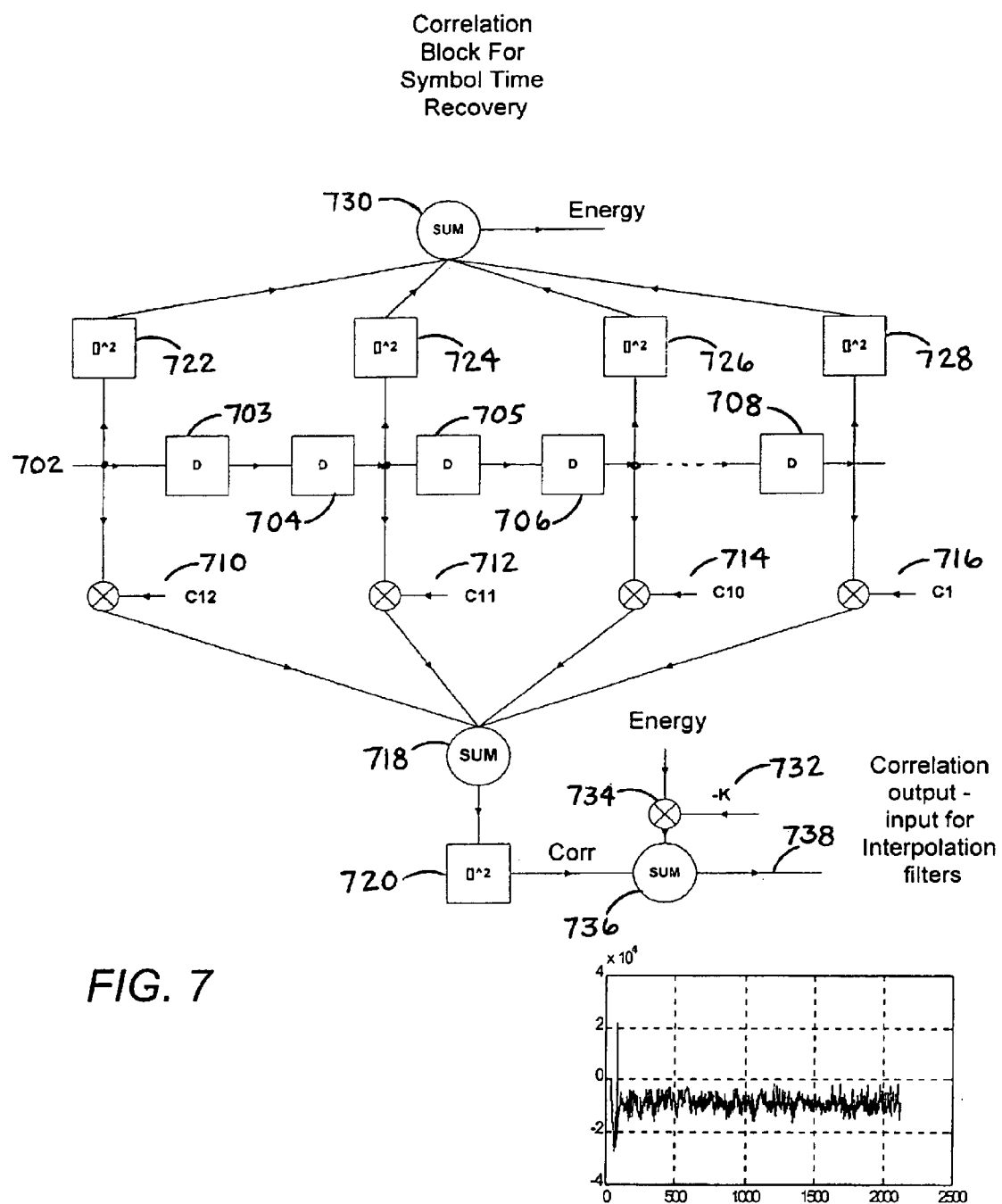
FIG. 7 is a block diagram of the correlator of FIG. 6.

FIG. 7 represents the functions performed by the correlation block 610 of FIG. 6. The 10-bit complex number pairs provided at 40 MSamples/s from the match filter (606 of FIG. 6) enter at 702. It is important to understand that the single line at 702 represents both I and Q values. The samples are sequentially shifted through registers 703–708 (representing 22 actual registers for each number). The twelve coefficients for the 12-bit expected preamble are represented by 710 (C12), 712 (C11), 714 (C10) and 716 (C1). These coefficients may be represented as either 1 or −1, simplifying the multiplication by each sample as it is shifted through the registers 703–708. The result of these multiplies is summed at sum block, and the output squared in squaring block to provide a single real value for the correlation.

However, in order to discriminate against noise, the noise energy is then subtracted from the correlation real value. Each complex pair presently being correlated—i.e. the current input at 702, and the value in registers 704, 706 and . . . 708, is squared at squaring blocks 722, 724, 726 and . . . 728, respectively. The resulting real values are then added in summing block 730. This sum of squared values reflects the uncorrelated energy of the sequence being tested for correlation. The energy is multiplied at multiplier 734 by −K 732, and the product is added to the squared correlation value from squaring block 720. The value of −K will depend upon scaling throughout the system, including the values of C1–C12. It is preferably selected such that the square of the correlation sum exceeds K times the energy sum only when a strong correlation is found, and thus the output 738 is positive only when a preamble correlation is detected. However, those skilled in the art will understand that other methods of distinguishing noise, and other methods of detecting a correlation, may be used as well.

4.f. Digital Loop Filter Block Diagram

Figure 8:
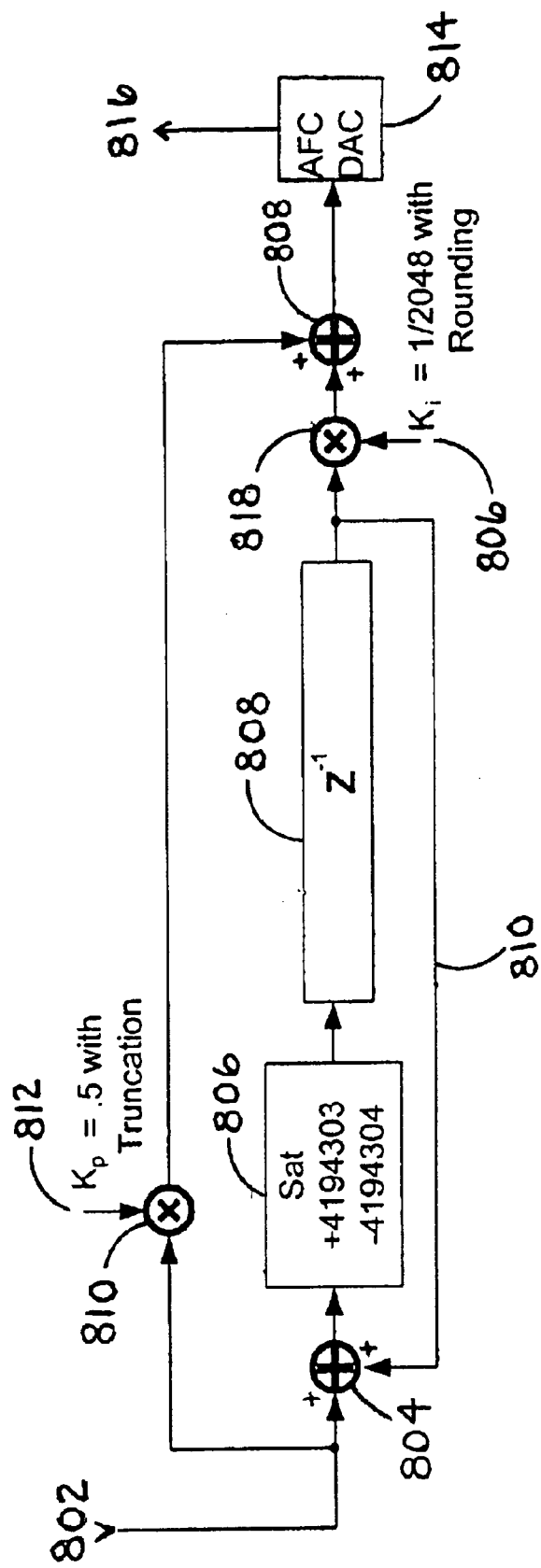
FIG. 8 is a block diagram of the digital loop filter of FIG. 6.

FIG. 8 shows the digital loop filter 656. Input 802 arrives from adder 634 of FIG. 6, and has an LSB value of 1/64 symbol period. It is summed with positive feedback output 810 at summing block 804, the result of which is clipped to between −4194304 and 4194303 in clipping block 806 to prevent rollover errors. After a one period delay 808, this value is multiplied by $K_i$ 806, which has a value of 1/2048 (with rounding). The resulting product is added, at summing block 808, to a product taken at multiplier 810 of input 802 by $K_p$ 812. $K_p$ is preferably 0.5. The sum developed at summing block 808 is applied to the digital to analog converter (DAC) 814. The analog output 816 from the DAC 814 is then connected to the slave symbol clock VCO (650 of FIG. 6). Those skilled in the art will appreciate that most items described in this embodiment, and especially the particular gain numbers 806 and 812, will preferably be varied in accordance with the LSB resolution value, the VCO gain, the sample rate, and other circuit circumstances and performance needs.

4.g. Interpolators

The interpolators such as 612–620 of FIG. 6 shift incoming correlation sequence data through a shift register, multiply each register output by a coefficient, and sum the result. The interpolators 612–620 use five coefficients in order to detect a slightly offset correlation sequence peak. The five coefficients currently used, for interpolations to interpolation4, respectively, are: −29, 151, 151, −29, 6; −13, 64, 226, −31, 6; 0, 0, 255, 0, 0; 6, −31, 226, 64, −13; and 6, −29, 151, 151, −29. The results may be scaled as desired for convenience, for example by right-shifting eight bits.

4.h. Peak Detector

Figure 9:
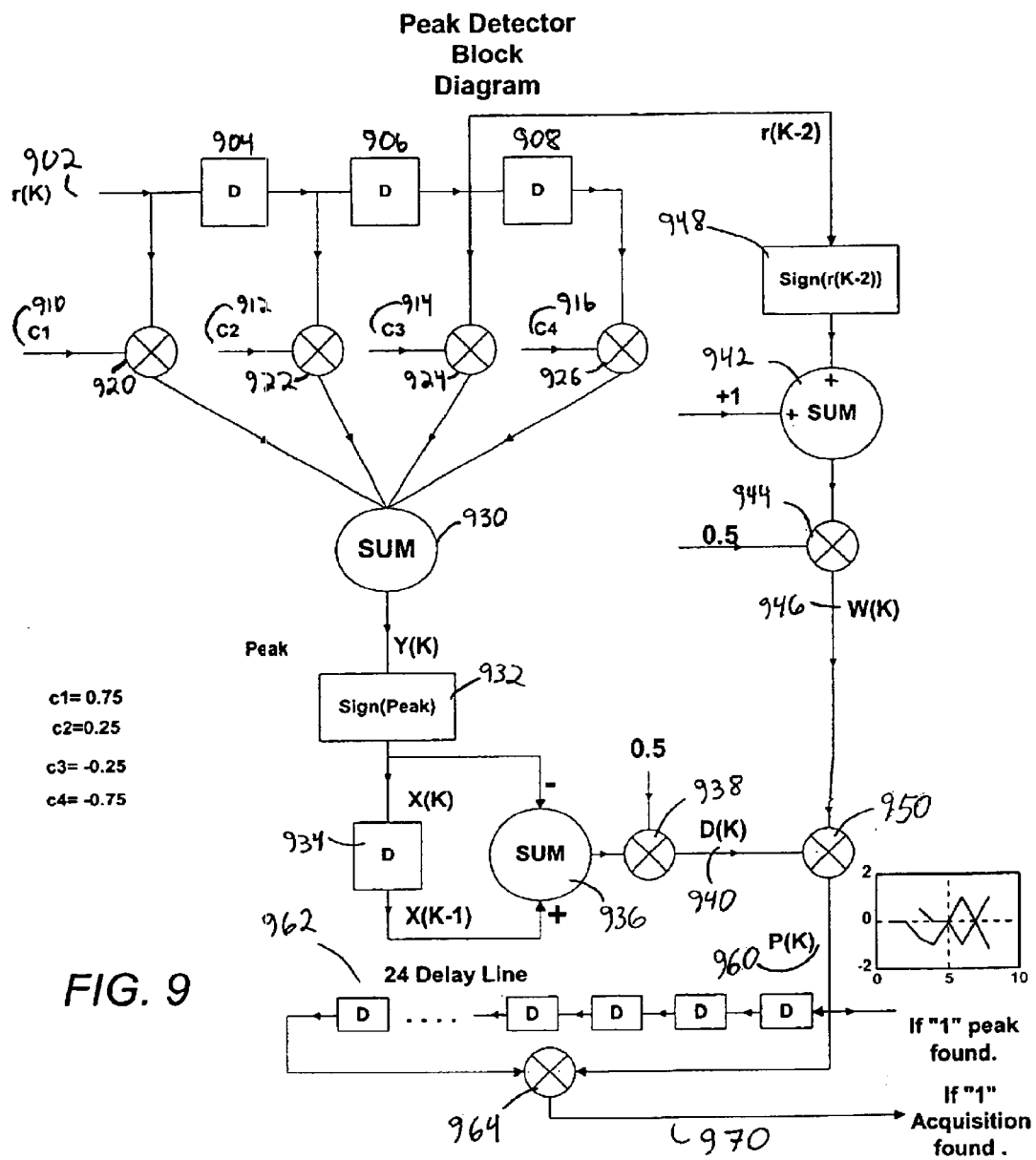
FIG. 9 is a block diagram of the peak detector of FIG. 6.

The peak detector 622 of FIG. 6 is shown in more refined block detail in FIG. 9. The input 902 takes the 10-bit real values output from the preamble correlation 610 (FIG. 6) and shifts them through shift registers 904, 906 and 908. At each point the value is multiplied by the corresponding coefficients 910, 912, 914 and 916 (C1 to C4, respectively). The preferred value for the coefficients is 0.75, 0.25, −0.25 and −0.75 respectively. The outputs are summed at 930, which reflects a derivative between correlation output samples. The circuit thereafter deduces the location of a peak by identifying (over a few samples) a sample point which has a positive derivative before it, and a negative derivative after it. Sign determining block 932 outputs X(k), with 1 indicating that sum 930 is positive, −1 indicating that sum 930 is negative, and 0 indicating that sum 930 is 0. Difference 936 is a difference between X(k−1), i.e. 932 delayed by single delay 934, and the present output X(k) of 932. That output is multiplied by 0.5 at multiplier 938, (which may be practically implemented as a one-bit right shift), resulting in D(k) 940. D(k) 940 can only be 1 if difference 936 was 2, which requires that X(k)=−1 and X(k−1)=+1, and thus the leading slope is positive and the trailing slope is negative, as required to identify a peak.

D(k) 940 equal to "1" suggests a peak, but is further discriminated by establishing that correlation output r(k−2) is greater than zero. This is accomplished by determining the sign of r(k−2) (the output of register 906) at sign block 948, which outputs 1, 0 or −1 as did block 932. This result is added to one at sum 942, and then truncated one bit less at "multiplier" 944, which may be a right-shift operation. This further results in W(k) 946, which is equal to 1 only if r(k−2) is positive. P(k) 960, the output from multiplier 950, is W(k)*D(k), and P(k)=1 identifies a peak. Delay lines 962 delay P(k) by the number of samples expected between redundant synchronization signals. These are sent particularly during acquisition, and when peaks are found separated by precisely the expected period indicates more certainly that the synchronization receipt time indicated by P(k) was the correct one. This will be reflected when output 970 from "multiply" 964 P(k)*P(k−i) is equal to 1 ("i" is the number of sample clock periods expected between redundant synchronization signals).

5. Network Clock Synchronization Across the Link

As explained previously in respect of FIGS. 1 and 2, some data traversing a link may arrive at a rate determined by a source network clock, e.g. $CNET_A$, 104. If the data must be delivered by User 124, it is useful for avoiding data loss to deliver the data at a rate determined by $CNET_D$, 132, which is substantially the same as $CNET_A$, 104. It is therefore desirable to determine a network source clock, such as $CNET_A$, 104, at a node e.g. 116, and to communicate the clock to another node, e.g. 124, across a link, 122, which communicates synchronously on the basis of a communication clock such as the synchronized symbol clock described above. In FIG. 2, the network clock is available to the master side 200 of a communication link as $CNet_1$ 216, and it is desirable to synchronize a corresponding $CNet_2$ 264 on the slave side 250 of the link, preferably without consuming much bandwidth in the process.

The network clock will generally not be available for explicit communication across the link, because such explicit communication generally requires too much of the available communication media, whether optical, wired or RF wireless. Moreover, the network clock will in general be entirely asynchronous to the (e.g.) symbol clock. The symbol clock (or any such clock separate from the network clock) is independently synchronized across the link, as described in the previous sections. It may be unnecessary to phase lock the network clock, since in many instances a frequency lock will suffice. If a first independent pair of clocks is synchronized across the link, as described above, then one may efficiently synchronize a second, independent pair of clocks across the same link by conveying data to the slave side which reflects a relationship on the master side between the first (synchronized) clock and the second independent clock. Thus, the synchronized symbol clocks described above may provide part of a solution for synchronizing constant bit-rate (CBR) data transfers across a communication link. Synchronized clocks, such as those described, may serve as "noncommon clocks" which may be leveraged to synchronize other independent clocks across the same link.

A noncommon clock compare (NCC) algorithm synchronizes independent clocks (e.g. network clocks) on each side of a communication link by leveraging a previously established relationship between two other independent, noncommon clocks on each side of the link (e.g. symbol clocks). Thus, four independent clocks are involved—each side of the link has both a noncommon clock and another clock. For example, a network clock (typically reflecting a rate at which a source of CBR data is being provided for communication across the link) may be reconstructed on the receiving side of a communication link by causing its relationship to a noncommon symbol clock local to its side of the link to match a relationship between a network clock on the transmitting side and a symbol clock local to that transmitting side. The symbol clocks will first be synchronized across the link, for example as described above. The (e.g.) symbol clocks are referred to as "noncommon" clocks because, although they are synchronized across the link as described above, they are inherently independent of each other. Their continued synchronization relies on nearly constant communication across the link.

A separate and independent (e.g. network) clock on a first side of the link will be compared to the noncommon, e.g. symbol, clock local to the first side, and a first clock relationship determined. The second side of the link will create a local analog of the network clock. The second-side network clock analog will be adjusted to have substantially the same relationship to the second-side version of the noncommon clock as was determined to exist between the network clock and the noncommon clock on the first-side.

The ensuing discussion addresses a transmit (Tx) or master side of the link and a receive (Rx) or slave side of the link with respect to the network clock. The master side is typically the base station (BS) side in an exemplary embodiment. Therefore, with regard to the network clock the terms BS, Tx and master are sometimes interchanged. The slave side, in the exemplary embodiment, is typically on the customer premise equipment (CPE) or receive side of the link. The master or transmit (e.g. BS) side is the side having access to a source network clock. The source network clock is consistent with the rate at which constant bit rate (CBR) data is being sent from its source. The slave or receive (e.g. CPE) side is receiving the CBR data, perhaps mixed with other non-CBR data, and must cause the CBR data to be clocked out at the source rate in order to prevent overflow or underflow of buffers.

The ensuing discussion is directed to clocks present at the ends of a communication link, as distinct from clocks which may be distributed around a generalized network. Accordingly, a different subscript is used for certain references, such as CNet, to avoid confusion with earlier general comments regarding $C_{NetA}$, $C_{Net1}$, etc. The network clocks will be designated $C_{NetS}$ for the slave side, typically the receiving side of CBR data, and $C_{NetM}$ for the master side, typically the side transmitting CBR data to the receive side. Note that the master side for the network clock need not be the same as the master side for the symbol clock. In fact, in some circumstances both sides of a link may be a network clock master side for different data streams, i.e. for data transmitted across the link from that side. Accordingly, those skilled in the art will appreciate that the following discussion may properly be generalized to encompass data travel in either or both directions, for a plurality of different network clocks, and to master sides (for particular data streams) which are on either side of the link, or even on both sides of the link.

5.a. Master Noncommon Clock Error

The following discussion is directed to one side or node of a communication link, as described above, which functions as a master for purposes of synchronizing the network clock. General reference may be made to FIG. 10. On such network clock master side, a noncommon clock error period (NCP) is a period of time $T_{NCP}$ defined by the duration of a selected number $N_{mnc}$ of master network clock $C_{NetM}$ cycles at the network clock frequency $f_{Net}$. Thus, $T_{NCP} = N_{mnc}/f_{Net}$. The number of noncommon clock cycles (at noncommon clock frequency $f_{nc}$) during a NCP is referred to as the noncommon clock error (NCE). The NCE of the master (or transmit-side) network clock to its local noncommon clock is indicated as TxNCE, while the slave-side analog is RxNCE.

The NCE has an expected or nominal value, and a minimum and maximum value which depend on the nominal values and on tolerances of the network and noncommon clocks. The nominal value of the NCE is $T_{NCP}*f_{nc}$, which is the same as $N_{mnc}*f_{nc}/f_{Net}$. The tolerances of the two clocks may be added (presuming they are uncorrelated) to determine the tolerance of their ratio. For example, if the network clock frequency $f_{Net}$ has a tolerance of 100 ppm, and the noncommon clock frequency $f_{nc}$ a tolerance of 75 ppm, then the ratio of $f_{nc}/f_{Net}$ will be known to within 175 ppm. Since $N_{mnc}$ is known, the range of the NCE will be readily calculated.

It is preferred that $T_{NCP}$ be an integer number of frame periods of the system. In an exemplary embodiment, the frame period is preferably 1 ms, and $T_{NCP}$ may be, for example, 10, 50 or 100 ms. In this embodiment, $f_{Net}$ is nominally 8.192 MHz, and $f_{nc}$ is nominally 10 MHz. As an example, if $T_{NCP}$ is 10 ms, $N_{mnc}$=10 ms*8.192 MHz=81920. The nominal NCE is 81920*10/8.192=100000. The range (assuming the given tolerance of 175 ppm) will be 36 (NCE=100000+/−17; 2 more are added for quantization error of the clocks).

In view of the known nominal values and tolerance, only P bits are required to unambiguously represent the NCE. For instance, in order to unambiguously represent values between 99975 and 100025, $2^P \geq 36$, so P=6. Therefore, a P-bit counter which is counting noncommon clock cycles is latched every $N_{mnc}$ master network clock cycles. The difference between successive latched values reflects NCE unambiguously. Using the same analysis for $T_{NCP}$=50 ms as a second example, the NCE range increases to 176 (500000+/−88), and accordingly P=8 in that case. Those skilled in the art will be able to analogously select an appropriate P for the circumstances of particular circuits.

5.b. Master Clock Relationship Determination

Figure 10:
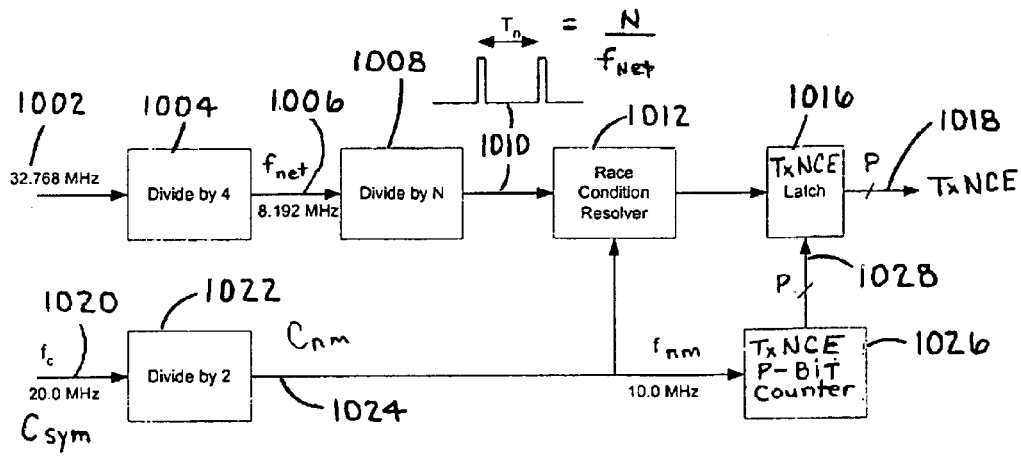
FIG. 10 represents a noncommon clock error calculator circuit.

We refer now more specifically to FIG. 10 to describe a representative embodiment of the master side, with respect to a network or secondary clock, of a communication link across which the network clocks will be synchronized by reference to their respective noncommon clocks. A clock 1002 available to the master side reflects a CBR data source clock, and has a nominal frequency of 32.768 MHz. Clock 1002 is divided down in divider 1004 to produce the network reference clock $C_{NetM}$ 1006 operating at a nominal $f_{Net}$ of 8.192 MHz. $C_{NetM}$ 1006 is further divided by $N_{mnc}$ at divider 1008 to provide NCP clock edges 1010 at a period of $T_{NCP}$ (=$N_{mnc}/f_{Net}$). A race condition resolver 1012 avoids ambiguity when the TxNCE counter 1026 is being latched into TxNCE latch 1016. The symbol clock $C_{Sym}$ 1020, operating at a nominal 20 MHz, is divided by divider 1022 to provide the master version of the noncommon clock, $C_{nm}$ 1024 at $f_{nc}$ of nominally 10 MHz. The TxNCE counter 1026 has at least P bits, the number of bits necessary to unambiguously represent $T_{NCP}*f_{nc}$, as explained above. The P (or more) bit output "transmit NCE" (TxNCE) 1018 from this circuit reflects the master noncommon clock error without ambiguity, based on knowledge of the expected (nominal) value of NCE. Any fractional value of TxNCE will be carried forward to subsequent NCE counts by virtue of the fact that the TxNCE counter 1026 is not reset; this avoids a random walk type of error on the value of the TxNCE.

5.c. Slave Clock Reconstruction

Figure 11:
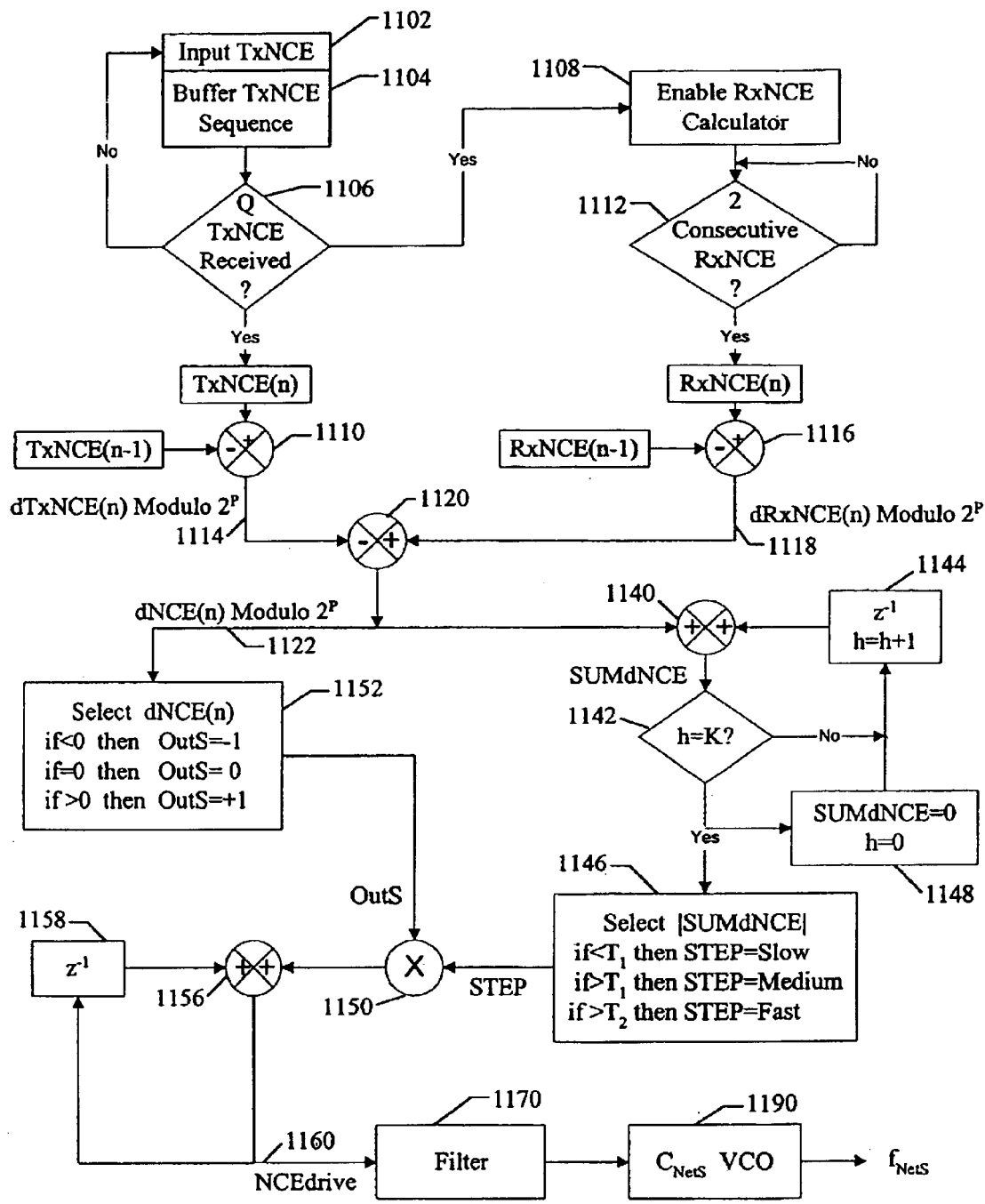
FIG. 11 is a flow chart for implementing slave network clock control.

FIG. 11 illustrates a flow chart for reconstruction of a slave network clock which is on the other side of a communication link from the master side which is described above. In this exemplary embodiment, TxNCE from the master will be conveyed to the slave about every $T_{NCP}$ at input block 1102. The incoming sequence of TxNCE values is buffered in buffer 1104. Test block 1106 determines when at least Q (typically 5 to 10) successive valid values of TxNCE are available, whereafter the difference dTxNCE(n) 1114 between the present value TxNCE(n) and the preceding value TxNCE(n−1) is determined, modulo $2^P$, at comparison 1110. Thus, assuming P=8, the values of TxNCE are compared by a modulo 256 compare. Generally, (A−B) mod N=(A−B) if A≧B, else=A−B+N. The output, dTxNCE(n) 1114, is held constant if the two values input into the modulo 256 compare 1106 are not both valid and consecutive. The TxNCE values may be sent redundantly but without other error correction, and if these received redundant copies are not identical, or an error is otherwise detected, then they may both be presumed invalid.

After Q (typically 5 to 10) valid TxNCEs have been received, the slave or receive NCE (RxNCE) calculator 1108 is enabled and calculates the slave value of NCE, RxNCE, from the slave network clock $C_{NetS}$ and the slave noncommon clock $C_{ns}$ in the same way as TxNCE is calculated on the master (or transmit) side from $C_{NetM}$ and $C_{nm}$. In the exemplary embodiment, both calculations use the same expected or nominal value for $T_{NCP}$, though the skilled person will recognize that many other relationships can work equivalently. RxNCE enters buffer/delay/test 1112. When two values are available for RxNCE, the difference dRxNCE(n) 1118 between the last two values RxNCE(n) and RxNCE(n−1) is taken modulo $2^P$ at RxNCE comparison 1116. The slave will not have invalid data from its own clocks; however, comparison to the master values may be postponed until the slave noncommon clock $C_{ns}$ is synchronized to the master noncommon clock $C_{nm}$. The actual NCE discrepancy dNCE(n) between the master and slave, dNCE(n) 1122, is determined by taking the difference dRxNCE(n)−dTxNCE(n) modulo $2^P$ at difference block 1120.

The skilled person will recognize that there are many ways to process this determined discrepancy dNCE(n) to obtain a drive value for adjusting the slave or receive-side network clock voltage controlled oscillator, $C_{NetS}$ VCO 1190 to produce $C_{NetS}$ at $f_{NetS}=f_{NetM}$. In an exemplary embodiment, K successive values of dNCE(n) are summed at summer 1140 to provide SUMdNCE. At block 1142, if counter h is less than K (typically, K=8) then the current value of SUMdNCE is delayed, and h incremented, at block 1144 before adding the next value of dNCE 1122. Once h=K so that SUMdNCE includes K values of dNCE, a step size STEP is selected at block 1146 based upon the magnitude of SUMdNCE. Each of the steps of block 1146 should be performed in order. If |SUMdNCE| is less than a first threshold $T_1$, then the step size is set to Slow (typically, a value of 2). If so, the next two tests will fail and may be skipped; if not, then if |SUMdNCE| is greater than $T_1$, STEP is set to Medium (typically, a value of 10). If |SUMdNCE| is also greater than a second threshold $T_2$ ($T_2>T_1$), then STEP is changed from Medium to Fast (typically, a value of 50); if the second threshold $T_2$ is not exceeded then STEP will remain at Medium. The thresholds $T_1$ and $T_2$ may be set to values of 2 and 3, respectively. In this exemplary embodiment, the VCO will change the output frequency by 0.005 ppm times the value of NCEdrive; thus Slow, Medium and Fast STEPs correspond to 0.01, 0.05 and 0.25 ppm per step; however, the number of ranges and the STEP values may be varied for different embodiments, as will be understood by skilled persons. At block 1148, when h=K the sum SUMdNCE and the counter h are both reset for the next addition at adder 1140. STEP is then output from block 1146 into multiplier 1150 until the next sum of K successive values of dNCE is accumulated. Meanwhile, each present value of dNCE(n) is simplified to "sign or zero" at block 1152 by selecting OutS=−1 if dNCE(n) is less than zero, OutS=0 if dNCE(n) is equal to zero, and OutS=1 if dNCE(n) is greater than zero. OutS is multiplied by STEP at multiplier 1150. A running total of this product of OutS and STEP is formed as NCEdrive 1160 by adding the previous value of NCEdrive 1160, delayed by delay 1158, to the product at adder 1156. Finally, the value of NCEdrive is filtered in Filter 1170 and then input to $C_{NetS}$ VCO 1190 to produce $C_{NetS}$ at $f_{NetS}$, where $f_{NetS}$ is on average equal to $f_{NetM}$. For a typical network clock which is defining a delivery rate for CBR data, such exact match of the average frequency is adequate to prevent overflow and underflow errors. However, the skilled person will recognize that for some purposes a closer lock between the master and slave (e.g. network) clocks will be advantageous, and that such closer lock may be obtained using the same basic noncommon clock compare technique shown here, with adjustments made to the described processing algorithm to improve the speed and accuracy of the $C_{NetS}$ frequency adjustment.

Figure 12:
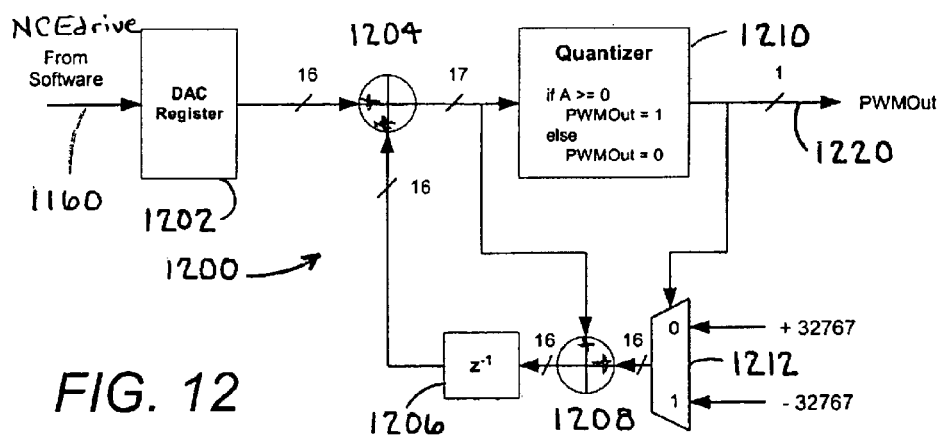
FIG. 12 details a sigma-delta DAC for use with the slave network clock control.

FIG. 12 shows an exemplary embodiment in which filter 1170 is implemented beginning with a first-order, 16-bit sigma-delta digital to analog converter (DAC). NCEdrive 1160 enters DAC register 1202, where it remains until updated after the next TxNCE is processed. The 16-bit word from DAC register 1202 is applied to the DAC 1200 generally. Specifically, it is input to adder 1204, where it is accumulated with the previous output from adder 1204 by way of delay 1206. Also, at adder 1208, either −32767 (if the output of quantizer 1210 is 1) or +32767 (if the output of quantizer 1210 is 0) is added from selector 1212 to the previous output of adder 1204. Quantizer 1210 outputs "1" if its input (the output of adder 1204) is greater than zero, and outputs "0" otherwise. In the exemplary embodiment, the sigma-delta converter is clocked at 20 MHz, resulting in a PWM output 1220 which is "1" for a time proportional to the value of NCEdrive 1160. In an exemplary embodiment, the voltage value of a "1" output is 5V, while the voltage value of a "0" output is 0V.

Figure 13:
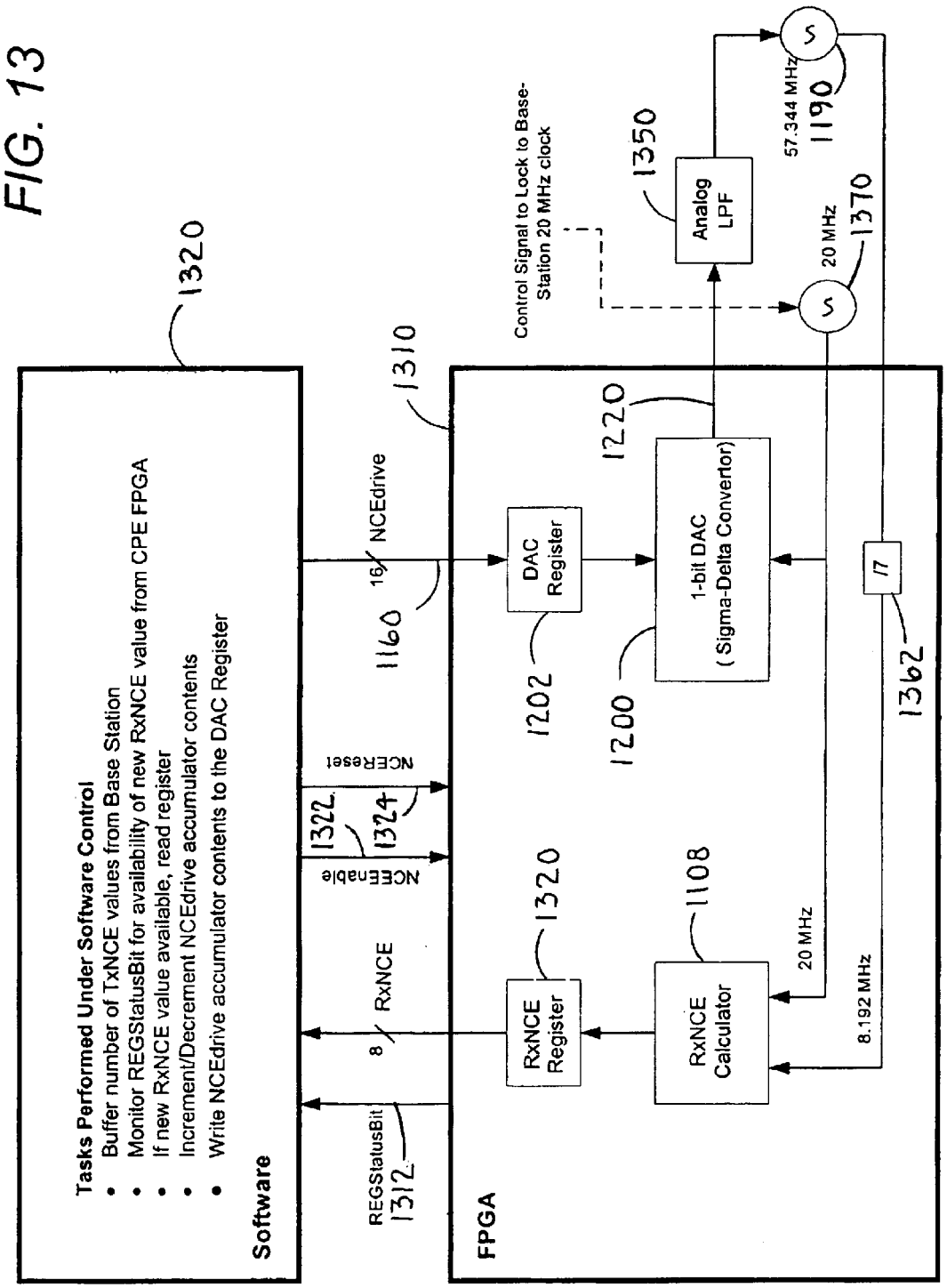
FIG. 13 shows a partitioning of network clock control tasks between hardware and software.

The skilled person will recognize that many alternative algorithms will perform the same basic tasks shown in FIGS. 10, 11 and 12, including of comparing differences between the network and noncommon clocks on each side of the link, and also that all or any part of the steps of the algorithm may be implemented in either software or in hardware (e.g. using a field-programmable gate array FPGA). FIG. 13 shows a division of functions between hardware and software in an exemplary embodiment. Slave, or receive-side noncommon clock 1370, operating at nominally 20 MHz, is controlled as described elsewhere in this application to lock to the master or transmit-side noncommon clock., and it's output is an input to the RxNCE calculator 1108. The FPGA 1310 accepts the NCEdrive 1160 value provided under software control from general purpose computer 1320. The FPGA 1310 incorporates the DAC register 1202, the value of which enters the DAC 1200. PWM output 1220 exits the FPGA 1310 to enter analog lowpass filter 1350, which has a bandwidth of 10 Hz or somewhat less. (The analog filter 1350 is incorporated in the Filter block 1170 of FIG. 11). The output of filter 1350 is applied to the control input of $C_{NetS}$ VCO 1190, which operates at a nominal 57.344 MHz. Also incorporated in $C_{NetS}$ VCO 1190 as shown in FIG. 11 is divider 1362, which divides the $C_{NetS}$ by 7 before it is input to the RxNCE calculator 1108. This calculator performs, on the slave or receive side, the functions shown in FIG. 10 for the master or transmit side. The output from calculator 1108 is placed in RxNCE Register 1320, and communicated to the general purpose computer 1320. Computer 1320 then performs steps corresponding to the functions shown in FIG. 11, with the exception of RxNCE Calculator 1108, Filter 1170 and $C_{NetS}$ VCO 1190.

In an exemplary embodiment, each count of NCEdrive adjusts the frequency of the $C_{NetS}$ VCO 1190 by about 0.005 ppm. For an exemplary embodiment, the VCO 1190 has a pull-in range of +/−100 ppm, a control voltage range of 0 to 5V, a frequency accuracy of +/−32 ppm and drift of +/−30 ppm. If the accuracy of the master network clock $C_{NetM}$ is X ppm, then the VCO needs to be set to have a control range, under the listed conditions, of about +/−(100+32+30+X) ppm; if $C_{NetM}$ has an accuracy of 1.6 ppm, then the range would be about +/−165 ppm. The exemplary embodiment, using a 16-bit converter, therefore has a resolution at NCEdrive of about 330 ppm/65536=0.005 ppm. The resolution can, of course, be changed for different embodiments.

Those skilled in the art will appreciate that the circuits described above are merely exemplary. In particular, a great deal of latitude is available as to how the functions are implemented. Most functions may be performed in either hardware or software according to ordinary engineering design decisions. Moreover, most of the circuits and functions described may be scaled for different clock speeds, filter coefficients, filter sizes, preamble sizes, and resolution needs.

The invention has been described in exemplary embodiments and aspects which are not limiting. Rather, the scope of the invention is defined by the claims which follow.

What is claimed is:

1. An apparatus for synchronizing a slave clock at a receiving end of a communication link to a master clock at a transmitting end of the communication link, comprising:
   master apparatus at the first end of the communication link including
      storage configured to retain a known data pattern,
      a sequencer configured to dispose the known data pattern as part of data for transmission to the receiving end of the communication link, a timer including a counter configured to produce an output based on counting a known number of master clock cycles as an interval between transmissions of the known data pattern, a transmitter configured to transmit, responsive to the timer counter output, a synchronization signal reflecting the known data pattern from the sequencer at intervals indicated by the timer; and slave apparatus at the receiving end of the communication link including a receiver configured to receive the transmitted synchronization signal, storage configured to retain a data pattern comparable to the received synchronization signal, a controllable slave clock oscillator having a variable slave clock rate, correlator apparatus configured to identify a synchronization time at which the received synchronization signal arrives in terms defined with respect to periods of a sample clock having a rate which is n times the slave clock rate, the correlator apparatus including a correlation digital signal generator configured to generate digital correlation signal samples at the sample clock rate, a digital correlation sample local maximum indicating the sample closest to when the synchronization signal and the stored comparable data pattern match, a correlation peak interpolator of the digital correlation signal, the correlation peak interpolator output indicating the synchronization time to an interpolator resolution less then 1/n of a slave clock period, a slave clock expected time generator configured to indicate an expected time when the synchronization signal will be received if the slave clock is synchronized to the master dock, a slave clock error generator configured to generate a slave clock error signal based on a difference between the expected time for the synchronization signal and the received synchronization signal time indicated by the correlator apparatus, and an error filter configured to output a filtered slave clock error to the slave clock controllable oscillator to adjust the slave clock rate.

2. The apparatus of claim 1, wherein the slave clock error generator includes an integrator configured to sum substantially all slave clock errors, at least at a slave clock period resolution.

3. The apparatus of claim 1, wherein the correlation peak interpolator includes a plurality of fibers, each filter configured to act upon the digital correlation signal near the correlation peak value, each filter representing a unique sample-time offset of less than 1/n period from an adjacent filter.

4. The apparatus of claim 3, wherein in operation each of the plurality of correlation peak interpolator filters simultaneously has a distinct output value.

5. The apparatus of claim 3 wherein each filter is a finite impulse response digital filter summing a product of 5 successive digital correlation signal samples each times one of 5 unique coefficients, and the interpolator resolution is about 1(n*4) slave clock periods.

6. The apparatus of claim 1, wherein the communication link is a wireless communication link in half-duplex operation.

7. The apparatus of claim 6, wherein the half-duplex operation employs adaptive time division duplexing.

8. The apparatus of claim 7, wherein the communication system includes a base station communicating across a plurality of links in each of a plurality of geographically restricted sectors, the base station including a transmitter for each particular sector, wherein each transmitter transmits a synchronizing signal simultaneously across each of the plurality of links within the particular sector.

9. The apparatus of claim 1, further including an interpolation estimator having correlation peak interpolator outputs as inputs, the interpolator estimator configured to output an estimation of the synchronization time location between the correlation peak interpolator outputs to a resolution smaller than the interpolator resolution.

10. The apparatus of claim 9, wherein the slave clock error generator includes an integrator which sums substantially all slave clock errors to at least a slave clock period resolution.

11. A millimeter-wave wireless communication system including the apparatus for synchronizing clocks across a link of claim 1, the communication system further comprising a base station configured to communicate to a multiplicity of CPEs across a plurality of links in each of a plurality of geographically restricted sectors, the base station including a transmitter for each particular sector configured to use an adaptive time division duplexing protocol, wherein each transmitter periodically simultaneously transmits a synchronizing signal across each of the plurality of links to a plurality of CPEs within the particular sector.

12. Receiver apparatus for use in a time division duplex communication system which synchronizes a variable frequency slave clock to a received synchronization signal, the receiver apparatus comprising:

storage for an expected synchronization signal and for an expected synchronization interval;

a controllable slave clock oscillator having a variable slave clock rate;

correlator apparatus which identifies a synchronization time at which the received synchronization signal arrives in terms defined with respect to periods of a sample clock having a rate which is n times the slave clock rate, the correlator apparatus including a correlation digital signal generator which generates digital correlation signal samples at the sample clock rate, a digital correlation sample local extrema indicating the sample closest to when the synchronization signal and the stored comparable data pattern match, and a correlation peak interpolator of the digital correlation signal, the correlation peak interpolator output indicating the synchronization time to an interpolator resolution less than 1/n of a slave clock period;

a slave clock expected-time generator to indicate an expected time when the synchronization signal will be received if the slave clock is synchronized to the synchronization signal;

a slave clock error generator to generate a slave clock error signal based on a difference between the expected time for the synchronization signal and the received synchronization signal time indicated by the correlator apparatus; and an error filter which outputs a filtered slave clock error to the controllable slave clock oscillator to adjust the slave clock rate.

13. The apparatus of claim 12, wherein the slave clock error generator includes an integrator which sums substantially all slave clock errors, at least at a slave clock period resolution.

14. The apparatus of claim 12, wherein the correlation peak interpolator includes a plurality of filters, each filter acting upon the digital correlation signal near the correlation peak value, each alter representing a unique sample-time offset of less than 1/n period from an adjacent filter.

15. The apparatus of claim 14 wherein each of the plurality of correlation peak interpolator filters simultaneously has a distinct output value.

16. The apparatus of claim 12, further including an interpolation estimator having
an input which receives correlation peak interpolator outputs,
a reinterpolator which approximates the received synchronization time between adjacent interpolator outputs to a resolution smaller than the interpolator resolution.

17. The apparatus of claim 16, wherein the slave clock error generator includes an integrator which sums substantially all slave clock errors to at least a slave clock period resolution.

18. A method of synchronization a receiver slave clock to a transmitter master clock across a communication link, comprising:
preparing one or more synchronization data patterns at the transmitter end of the communication link;
determining synchronizing intervals of time, in terms of master clock periods, by which to separate synchronization transmissions,
making the synchronization transmission intervals and the synchronization data patterns known at the receiver as expected synchronization signals and expected synchronization intervals;
transmitting synchronization signals reflecting the synchronization data patterns at the synchronizing intervals from the transmitter to the receiver;
providing a controllable slave clock variable frequency oscillator;
correlating received signals with a data signal comparable to the synchronization signal expected by the receiver to determine a synchronization receipt time, the correlation including
generating a correlation digital sequence reflecting correlation between the received signal and the comparable data signal at a sample rate of n times the slave clock;
identifying a best correlation sample of the correlation digital sequence reflecting a best correlation, and a best correlation portion of the correlation digital sequence about the best correlation sample, thereby identifying the synchronization receipt time to the 1/n slave clock resolution of the sample;
passing the best correlation portion to and interpolator; and
interpolating the best correlation portion to produce interpolation outputs reflecting the synchronization receipt time to an interpolation resolution which is less than 1/n slave clock periods;
selecting an interpolation output indicating a location of the synchronization receipt time between to the interpolation resolution;
determining at the receiver an expected synchronization receipt time based on an expected number of slave clock periods in the synchronization interval;
determining a slave clock error by comparing the synchronization receipt time with the expected synchronization receipt time; and
providing a filtered slave clock error input to control the slave variable frequency oscillator.

19. The method of claim 18 wherein the interpolation outputs are a plurality of distinct outputs each reflecting an interpolation of the synchronization receipt time by about an interpolation resolution amount different from an adjacent interpolation output, the correlation further including:
comparing the interpolation outputs to estimate the synchronization receipt time to within less than interpolation resolution.

20. The method of claim 19 including comparing values of interpolation outputs adjacent either side of the interpolation output reflecting the best correlation at correlator resolution in order to estimate the best correlation at less than correlator resolution.

21. The method of claim 18 including summing substantially all of the slave clock error at least at slave clock period resolution such that an average phase of the slave clock is locked to an average phase of the master clock.

22. The method of claim 18 wherein interpolating the best correlation portion includes passing the best correlation portion through a plurality of filters each having a sequence of coefficients.

23. The method of claim 22 wherein interpolating the best correlation portion includes processing the best correlation portion by all interpolation filters in parallel, and determining the best correlation interpolation by comparing the values of all interpolators from the same moment.

24. The method of claim 18 wherein the communication link communicates data in a framed adaptive time division multiplexing format.

25. The method of claim 24 further including transmitting synchronizing information to the receiver for less than 1/1000 of communication symbol time.

26. A method for transmitters in a millimeter wave wireless communication system using adaptive time division duplexing to permit a receiver slave clock to be synchronized to a transmitter master clock in accordance with the method of claim 18, the method comprising:
determining synchronization signal transmit times by causing intervals between synchronization signals to be a predetermined number of master clock periods;
transmitting synchronization signals reflecting predetermined synchronization data at the synchronization signal transmit times.

27. Apparatus for a transmitter in a time division duplex communication system to provide synchronization signals to enable a receiver to synchronize a receiver clock to a transmitter clock in accordance with the method of claim 18.

28. A method of synchronizing clocks across a communication link for conveying information between a first side and a second side opposite the first side, the method comprising:
establishing a master clock on a master side of the link;
providing a slave clock on a slave side of the link opposite the master side;
providing a first noncommon clock on the first side of the link;
providing, on the second side of the link, a second noncommon clock having a frequency which is independent of the first noncommon clock;
transmitting a periodic synchronization signal from the first side of the link to be received on the second side of the link;
adjusting the frequency of the second noncommon clock on the basis of a difference between a characteristic of the received synchronization signal and an expected characteristic of the synchronization signal to synchronize the second noncommon clock to the first noncommon clock; and thereafter, determining a master relationship between the master clock and the noncommon clock on the same side of the link as the master clock including comparing the master clock and the noncommon clock;

communicating the determined master relationship to the opposite slave side of the link;

determining a slave relationship between the slave clock and the noncommon clock on the same side of the link as the slave clock including comparing the slave clock and the noncommon clock; and adjusting the slave clock to cause the slave relationship to substantially become a known function of the master relationship such that the slave clock is synchronized with the master clock.

29. The method of synchronizing clocks of claim 28 including adjusting the slave clock to cause the slave relationship to become substantially the same as the master relationship.

30. The method of synchronizing clocks of claim 28 wherein the expected characteristic of the synchronization signal is the time of arrival of the synchronization signal as measured according to the second noncommon clock.

31. The method of synchronizing clocks of claim 30 wherein the step of synchronizing the first and second noncommon clocks includes phase locking the noncommon clocks.

32. The method of synchronizing clocks of claim 28 wherein the difference between the time of arrival of the synchronizing signal and the expected time of arrival based on the second noncommon clock is measured to at least a resolution of one eighth noncommon clock period.

33. The method of synchronizing clocks of claim 28 wherein each synchronization signal is transmitted a number, known to the receiver, of noncommon clock cycles after the previous synchronization signal such that the number of noncommon clock cycles between synchronization signals is known to the receiver.

34. The method of synchronizing clocks of claim 28 wherein each noncommon clock is derived from a symbol clock used in the modulation and demodulation of symbols communicated across the communication link.

35. The method of synchronizing clocks of claim 28 wherein the master clock reflects an incoming rate of constant bit-rate data.

36. The method of synchronizing clocks of claim 28 wherein the master relationship between the master clock and the noncommon clock on the same side of the link as the master clock is a number of edges of one of the clocks falling in a period of time defined by a known number of cycles of the other clock.

37. The method of synchronizing clocks of claim 36 wherein the one of the clocks is the noncommon clock on the master side, and the other clock is the master clock, and the known number of cycles of the master clock require a period of between 10 ms and 100 ms.

38. The method of synchronizing clocks of claim 36 wherein the step of communicating the master relationship across the link includes sending a number representing the number of edges falling in the defined period of time is performed about once per the defined period of time, and wherein the number thus sent has less than the number of bits required to explicitly convey the number of edges but at least as many bits as are necessary to unambiguously determine the number of edges based upon a previously established expectation of the range within which the number of edges will fall.

39. A method in a communication system of adjusting a rate of delivering data which has been received at a station from a different station across a communication link, the method comprising:

providing a noncommon clock at the station;

taking steps to synchronize the noncommon clock with a corresponding clock presumed to be operating at the different station, the steps including
sending synchronization signals which reflect a time period defined by the noncommon clock,
receiving synchronization signals and adjusting the noncommon clock frequency to reflect a timing between the received synchronization signals;

providing a data rate clock at the station to control the rate of delivering the received data;

determining a relationship between the data rate clock and the noncommon clock;

comparing the determined relationship to particular data received across the link and presumed to indicate a corresponding relationship between clocks at the different station; and adjusting a frequency of the data rate clock on the basis of a difference between the determined relationship of the clocks at the station and the corresponding relationship presumably indicated by the particular received data.

40. A method in a communication system local station of providing information sufficient to permit synchronization of a remote data rate clock to a data rate clock available at the local station, the method comprising:

providing a local noncommon clock at the local station;

taking steps to synchronize the noncommon clock with a corresponding clock presumed to be operating at the remote station, the steps including
sending synchronization signals which reflect a time period defined by the local noncommon clock,
receiving synchronization signals and adjusting a frequency of the local noncommon clock to reflect a timing between the received synchronization signals;

periodically determining a relationship between the local data rate clock and the local noncommon clock, including counting a number of cycles of one of the local clocks which fall within a time period defined by a predetermined number of cycles of another of the local clocks; and periodically transmitting data reflecting the relationship between the local data rate clock and the local noncommon clock to the remote station.

41. A system for synchronizing a plurality of independent clocks across a communication link, comprising:

a first noncommon clock module configured to provide reference timing for transmission of a noncommon clock synchronization signal across the communication link according to a first noncommon clock;

a second noncommon clock module configured to adjust a second noncommon clock in response to the received noncommon clock synchronization signal for synchronizing the second noncommon clock to the first noncommon clock;

a master-side communication station including the first noncommon clock module, and further including:
a master-side modem module configured to transmit data to a slave-side communication station, and a master secondary clock module configured to provide
a master secondary clock,
determine a master timing relationship between the
master secondary clock and the noncommon clock of
the master-side station, and
provide data reflecting the master timing relationship to
the master-side modem module for transmission to
the slave-side communication station; and
the slave-side communication station, including the second noncommon clock module and further including:
a slave-side modem module configured to receive the
data reflecting the master timing relationship from
the master-side communication station, and
a slave secondary clock module configured to provide
a slave secondary clock,
determine a slave timing relationship between the slave
secondary clock and the noncommon clock of the
slave-side station, and
adjust a frequency of the slave secondary clock on the
basis of a difference between the determined slave
timing relationship and the received data reflecting
the master timing relationship.

* * * * *